US012263976B2

(12) United States Patent
Schwartz et al.

(10) Patent No.: US 12,263,976 B2
(45) Date of Patent: Apr. 1, 2025

(54) ROTARY FILLING MACHINE

(71) Applicant: Spee-Dee Packaging Machinery, Inc., Sturtevant, WI (US)

(72) Inventors: Joshua A. Schwartz, Mount Pleasant, WI (US); James R. Knudsen, Racine, WI (US); Ronald B. Brandt, Mount Pleasant, WI (US); James P. Navin, Burlington, WI (US); Anthony D. Stefanelli, Boyceville, WI (US); Darren Beahler, West Allis, WI (US); Andrew Boles, Kenosha, WI (US)

(73) Assignee: Spee-Dee Packaging Machinery, Inc., Sturtevant, WI (US)

( * ) Notice: Subject to any disclaimer, the term of this patent is extended or adjusted under 35 U.S.C. 154(b) by 161 days.

(21) Appl. No.: 17/662,708

(22) Filed: May 10, 2022

(65) Prior Publication Data

US 2022/0267041 A1 Aug. 25, 2022

Related U.S. Application Data

(63) Continuation-in-part of application No. 17/306,115, filed on May 3, 2021, now abandoned, which is a (Continued)

(51) Int. Cl.

*B65B 43/50* (2006.01)
*B65B 1/06* (2006.01)

(Continued)

(52) U.S. Cl.

CPC ................ *B65B 43/50* (2013.01); *B65B 1/06* (2013.01); *B65B 1/30* (2013.01); *B65B 39/007* (2013.01);

(Continued)

(58) Field of Classification Search

CPC .. B65B 43/50; B65B 1/06; B65B 1/30; B65B 39/007; B65B 2039/009; B65B 29/00; B65B 43/60; B67C 11/02

(Continued)

(56) References Cited

U.S. PATENT DOCUMENTS

| | | | | |
|---|---|---|---|---|
| 2,156,271 A | | 5/1939 | Beck | |
| 2,655,301 A | * | 10/1953 | Riemer | B65B 1/363 141/93 |

(Continued)

FOREIGN PATENT DOCUMENTS

| | | |
|---|---|---|
| CN | 101119913 | 2/2008 |
| JP | 2001129058 | 5/2001 |

*Primary Examiner* — Timothy P. Kelly
*Assistant Examiner* — Stephanie A Shrieves
(74) *Attorney, Agent, or Firm* — Boyle Fredrickson, S.C.

(57) ABSTRACT

A rotary filling machine includes a rotatable fill plate with fill openings defined therein, a plurality of circumferentially spaced drop buckets mounted above the fill plate and configured to rotate with the fill plate, and a rotating mounting plate mounted on top of the fill plate and disposed below the drop buckets. Each drop bucket includes an inner radial wall, an outer radial wall, a first sidewall, and a second sidewall surrounding a volume bounded by top and bottom openings. A coupler for each drop bucket includes a first connector, such as a socket, extending from an outer surface of the inner radial wall and a mating connector, such as a post, extending upwardly from the mounting ring. A plurality of ridges or protrusions are formed on a side surface of at least one of the walls to reduce the planar surface area available for adhesion to materials being dispensed.

22 Claims, 23 Drawing Sheets

Related U.S. Application Data continuation of application No. 16/577,776, filed on Sep. 20, 2019, now Pat. No. 10,994,879.

(51) Int. Cl.
*B65B 1/30* (2006.01)
*B65B 39/00* (2006.01)
*B67C 11/02* (2006.01)

(52) U.S. Cl.
CPC ......... *B67C 11/02* (2013.01); *B65B 2039/009* (2013.01)

(58) Field of Classification Search
USPC ........................................................ 141/144
See application file for complete search history.

(56) References Cited

U.S. PATENT DOCUMENTS

| | | | | | |
|---|---|---|---|---|---|
| 2,691,476 | A * | 10/1954 | Petrea | B65B 43/50 | 141/114 |
| 2,700,498 | A * | 1/1955 | Lince | B65B 57/06 | 141/141 |
| 3,199,550 | A * | 8/1965 | Felton | B65B 1/18 | 141/315 |
| 3,215,173 | A * | 11/1965 | Rutherford | B65B 43/60 | 177/160 |
| 3,311,140 | A * | 3/1967 | Hughes | B65B 1/363 | 141/144 |
| 3,477,617 | A * | 11/1969 | Techtmann | B65B 1/363 | 141/147 |
| 4,478,300 | A * | 10/1984 | Mikami | B65G 11/166 | 177/128 |
| 4,702,289 | A * | 10/1987 | Benner, Jr. | B65B 1/363 | 53/562 |
| 5,082,032 | A * | 1/1992 | Crocker | B65B 1/363 | 141/144 |
| 5,337,794 | A * | 8/1994 | Nishiyama | B65B 31/022 | 141/264 |
| 5,551,492 | A * | 9/1996 | Rack | B65B 1/363 | 141/147 |
| 5,593,067 | A * | 1/1997 | Shaw | B67C 11/04 | 222/511 |
| 5,687,551 | A * | 11/1997 | Mustain | B65B 43/60 | 141/10 |
| 5,762,116 | A | 6/1998 | Moore | | |
| 6,119,440 | A * | 9/2000 | Benner, Jr. | B65B 39/145 | 53/473 |
| 8,991,442 | B1 * | 3/2015 | Navin | B65B 43/50 | 141/2 |
| 2004/0261357 | A1 * | 12/2004 | Takahashi | B65B 37/08 | 53/247 |
| 2013/0126041 | A1 | 5/2013 | Bailey et al. | | |
| 2017/0029142 | A1 * | 2/2017 | Evans | B65B 1/36 | |
| 2017/0361967 | A1 * | 12/2017 | Campagnoli | B65B 43/60 | |
| 2018/0215489 | A1 * | 8/2018 | Gallaun | B65B 39/10 | |

* cited by examiner

ROTARY FILLING MACHINE

CROSS REFERENCE TO A RELATED APPLICATION

The present application is a continuation-in-part of U.S. patent application Ser. No. 17/306,115, filed May 3, 2021 and assigned to Applicant, which is a continuation of U.S. Pat. No. 10,994,879, filed Sep. 20, 2019, issued May 4, 2021, and assigned to Applicant, the subject matter of each of which is hereby incorporated by reference in its entirety.

BACKGROUND OF THE INVENTION

1. Field of the Invention

The invention generally relates to the field of rotary machines for dispensing controlled volumes of dry materials into containers and, more particularly, relates to a rotary filling machine for dispensing bridgeable dry materials that are prone to clumping and/or sticking and to a method of operating such a machine.

2. Discussion of the Related Art

Rotary filling machines are routinely used for dispensing dry materials into containers from above. Such machines typically include a rotating turret located underneath a rotary combination scale or other device delivering materials to be dispensed. The turret supports a plurality of circumferentially-spaced drop buckets or bins having lower openings. The opening of each drop bucket or bin cooperates with an underlying funnel. In operation, each drop bucket receives a designated quantity of materials as it rotates under the delivering device and discharges the materials into the associated funnel. The materials then flow through the funnel and are dispensed into an underlying container that is spaced circumferentially from the delivery device.

Dispensing of some materials can be problematic due to their propensity to "bridge" or span gaps and material pathways in the fill equipment and clog the equipment. Some such materials are relatively tacky or have high adhesive properties, which cause the materials to clump or stick to one another and/or to stick to the drop bucket or funnel. Typical of such materials are "gummies," which are relative soft, chewable sweet foods. Gummies are typically, but not always, gelatin based. They are most often used in candy, but also are used in other materials such as chewable vitamins and medicines. They vary in size and shape, though most are "bite size", i.e., having a maximum diameter of less than 5 cm. Some take the appearance of fanciful or stylized animals such as bears or fish. Others are in the form of a generally elliptical tablet. They may or may not be sugar coated. The propensity of these materials to clump together and to stick to surfaces of the filling machine creates a tendency to bridge or clog flow path portions such as the bottom opening of a drop bucket or the throat of a funnel. Bridging is of particular concern when filling a container having a relatively small-diameter fill-opening with a material formed relatively large-diameter particles because the particles must be directed through relatively small fill openings, sometimes having a diameter of only 2-3 times that of the maximum particle diameter. Even if they do not bridge sufficiently to clog a flow path, the materials may nevertheless stick to a surface such as the bottom of the drop bucket adjacent the bottom opening or to the side surface of the funnel sufficiently long to delay or prevent dispensing into an underlying container, or to at least fall into the container in clumps rather than one at a time. The resultant delay/blockage can cause reduced fill accuracy including partial fill and no-fill conditions.

Other materials are not as sticky as traditional gummies, but are still subject to entanglement with one another such that they bridge openings or spaces. Some nuts, such as cashews, exhibit this characteristic.

"Bridgeable materials," as used herein, thus means any discrete dry particles that have a relatively high propensity to clump by adhesion and/or entanglement with one another and/or to stick to other surfaces. Bridgeable materials include, for example, gummies, which are tacky or have high adhesive characteristics, and some nuts such as cashews, which are prone to entanglement.

The need therefore has arisen to provide a rotary filling machine that is capable of reliably dispensing bridgeable dry materials in a controlled, predictable manner.

The need additionally has arisen to provide a rotary filling machine that meters the dispensing of bridgeable materials in a manner that reduces or prevents clumping and/or bridging.

The need additionally has arisen to provide a rotary filling machine that "singulates" dispensed bridgeable materials so that they are dispensed into the container, more often than not, one at a time as opposed to in clumps or batches.

BRIEF DESCRIPTION

In accordance with a first aspect of the invention, a rotary filling machine includes a rotatable fill plate with fill openings defined therein, a plurality of circumferentially spaced drop buckets mounted above the fill plate and configured to rotate with the fill plate, a rotating wear plate mounted on top of the fill plate and disposed below the drop buckets. Each drop bucket includes a volume bounded by an inner radial wall, an outer radial wall, a first sidewall, a second sidewall, a top opening, and a bottom opening. A first connector extends from an outer surface of the inner radial wall. The wear plate includes an outer ring located radially outboard of the fill openings of the fill plate and an inner mounting ring located radially inward of the fill openings. The second connector extends upward from the inner mounting ring.

The first connector may be in the form of a socket extending from an outer surface of the inner radial wall and surrounding a cavity. The second connector may be in the form of an associated post extending upward from the inner mounting ring. The post is configured to be disposed within the cavity of the socket when the drop bucket is mounted to the inner mounting ring. Further yet, the socket may include a protrusion extending into the cavity and configured to interfit with a corresponding recess formed in a surface of the post. Alternatively, the socket may include the recess and the post may include the protrusion.

Further, each drop bucket may include one or more partitions extending between the inner and outer radial walls. The partitions act to divide the volume into discrete chambers. Ridges or other protrusions may be formed on inner surfaces of the first and second sidewalls and/or on side surfaces of the partitions to reduce the planar contact surface area of the sidewalls and partitions. A plurality of ridges (which also could be considered ribs) or other protrusions are formed on a side surface of at least one of the walls and/or partitions to reduce the planar surface area available for adhesion to materials being dispensed.

In accordance with another aspect of the invention, a drop bucket is provided for a filling machine. The drop bucket has at least some of the characteristics described above.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation.

BRIEF DESCRIPTION OF THE DRAWINGS

Exemplary embodiments of the invention are illustrated in the accompanying drawings, in which like reference numerals represent like parts throughout, and in which.

DETAILED DESCRIPTION

Figure 1:
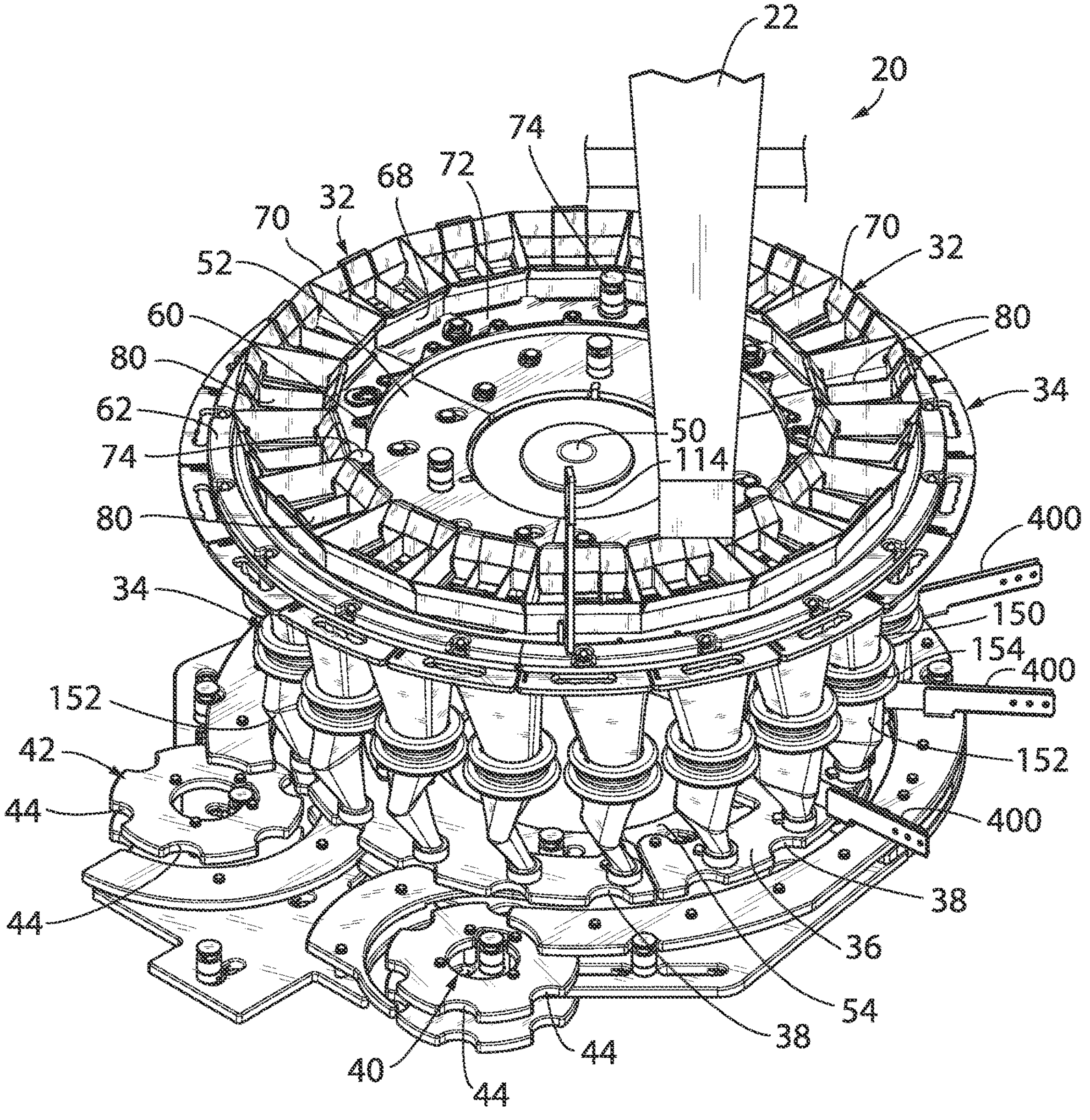
FIG. 1 is a perspective view of a rotary dispensing machine constructed in accordance with the present invention.
Figure 2:
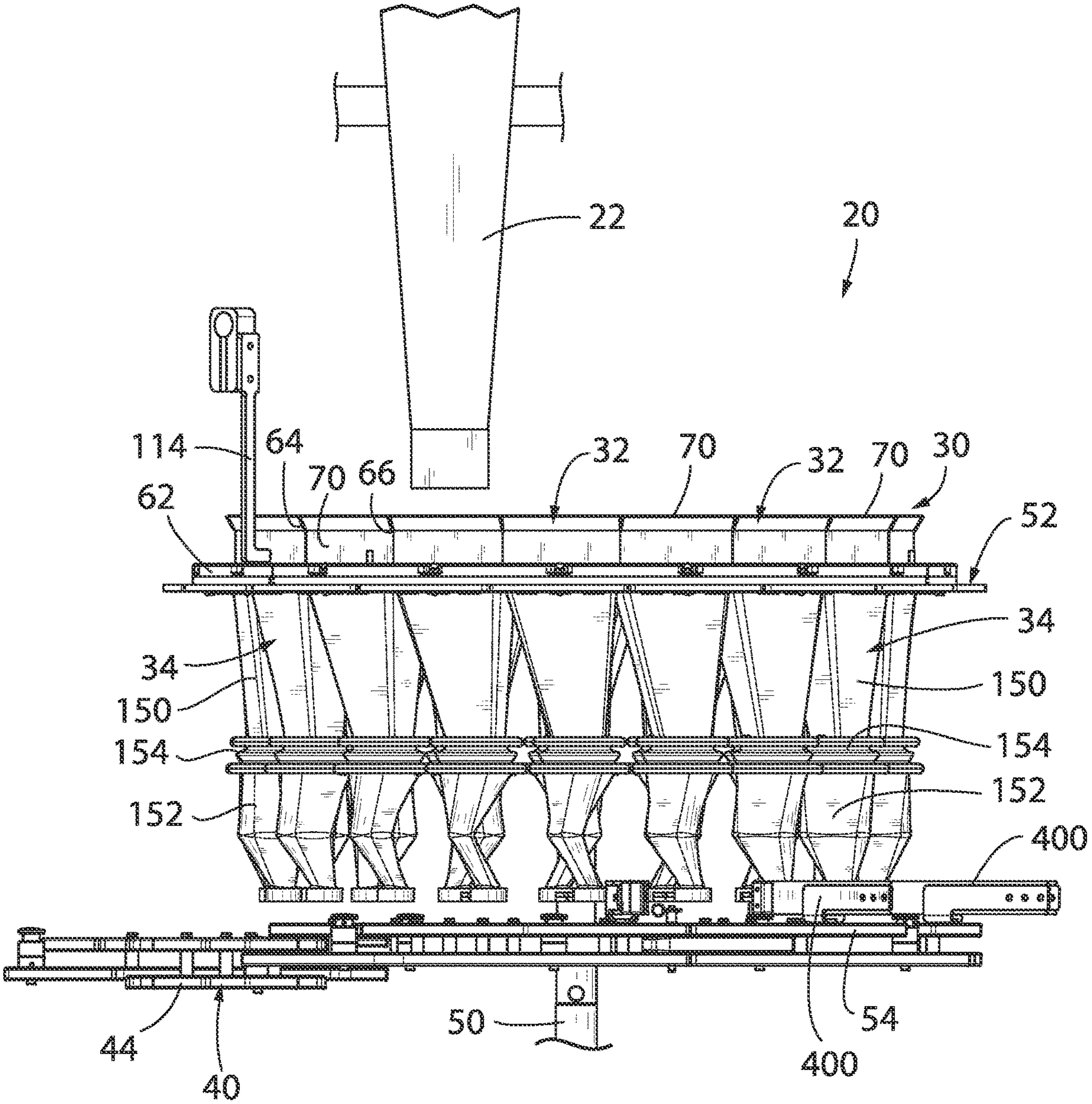
FIG. 2 is a side elevation view of the rotary dispensing machine of FIG. 1.
Figure 3:
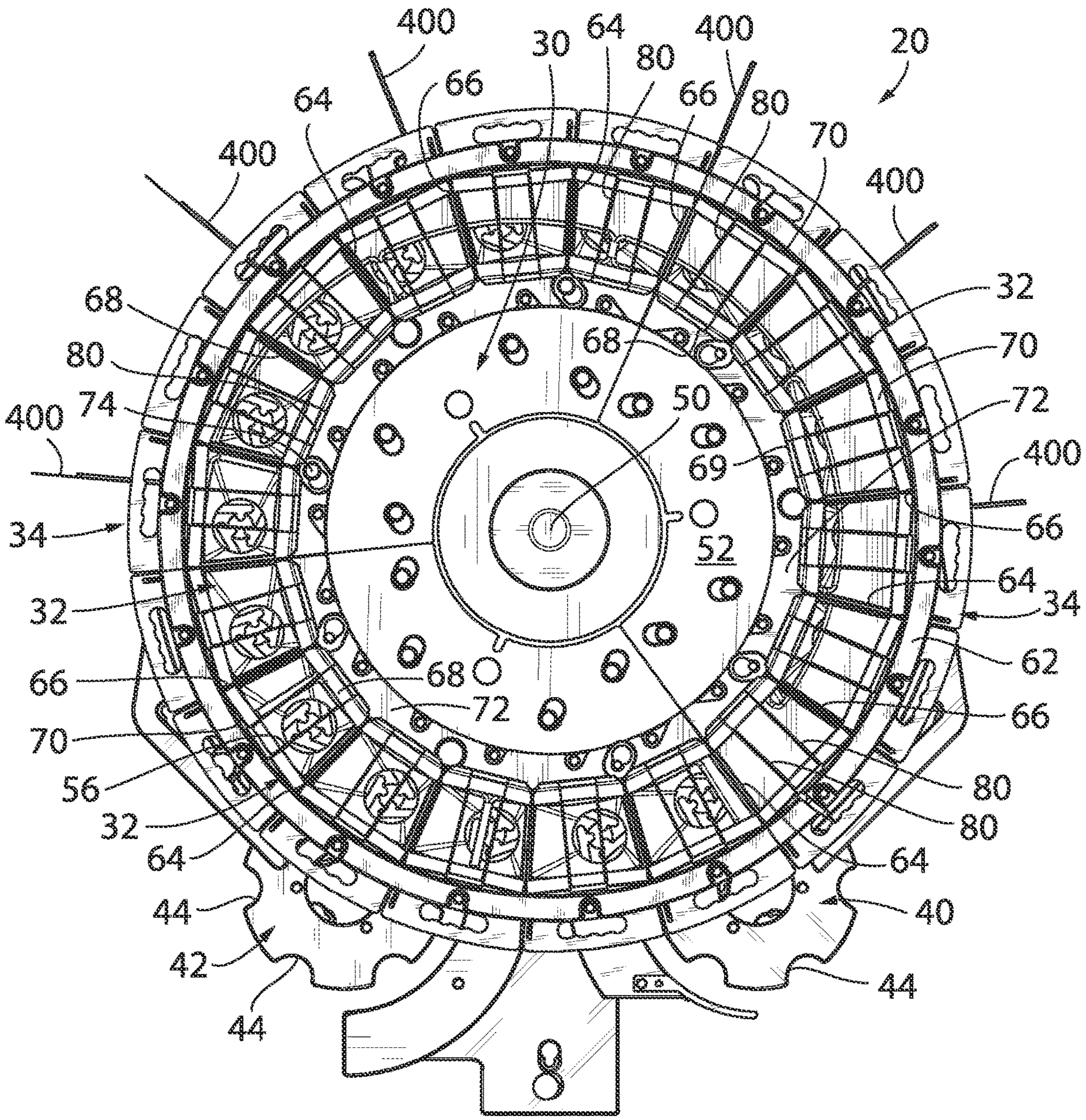
FIG. 3 is a top plan view of the rotary filling machine of FIGS. 1 and 2.

Turning initially to FIGS. 1-3, a rotary filling machine 20 that is constructed in accordance with the invention is illustrated. The machine 20 is configured to receive bridgeable dry materials (as that term is defined above) from a delivery system and to dispense the materials in a controlled manner into underlying containers. The "controlled" manner may be a designated number of particles per receptacle, a designated weight of particles per receptacle, or a designated volume of particles per receptacle. In the illustrated embodiment, the delivery system comprises a rotary combination scale 22 that receives materials from a conveyor (not shown) and that dispenses a given weight of materials per batch. If, as is typically the case, the average number of particles per a given weight is known, the rotary combination scale 22 thus dispenses a given number of particles per batch. Once such rotary combination scale is available through Yamoto, but can be supplied by any number of vendors. The illustrated rotary filling machine is optimized to fill bottles with gummies having a maximum dimension of about 2.25 cm and to dispense those gummies into a bottle having a fill opening diameter of 4.25 to 4.50 cm. The machine configuration, and most notably the configuration of the funnel assemblies described below, could vary considerably depending upon the size and characteristics of the particles being handled and the fill opening diameter of the container being filled.

Still referring to FIGS. 1-3, the rotary filling machine 20 includes a rotating turret 30 supporting a plurality (18) of circumferentially spaced drop buckets 32 and an equal number of funnel assemblies 34, one of which is associated with each drop bucket 32. A like plurality of container holders 36 (it being understood that "container" as used herein means any receptacle configured to receive materials from the funnel assemblies) are mounted on the bottom of the hub 30 beneath the funnel assemblies 34 for receiving containers to be filled. In addition, and significantly, a stationary slide plate 100 (first seen in FIG. 4) is mounted on the turret 30 vertically between the drop buckets 32 and the funnel assemblies 34 for dilating or singulating the flow of materials from the drop buckets 32 to the funnel assemblies 34. Of course, fewer or more drop buckets and container holders could be provided, depending on factors including, for example, the diameter of the turret 30, the size and/or shape of the openings of the containers 37, and designer preference.

The containers 37 (FIGS. 9 and 10) of this particular embodiment are bottles, and the container holders 36 can be thought of as bottle holders. Each bottle holder 36 has a notch 38 configured for a specific bottle shape and size to receive a bottle 37, thus holding a bottle in place beneath the associated funnel assembly 34 during the filling operation. Bottles are delivered to and received from the container holders 36 by way of a conveyor (not shown) that delivers empty bottles to an upstream transferring device 40 and receives empty bottles from a down-stream-most bottle holder 36 via a downstream transferring device 42. Each transferring device 40, 42 has a plurality of circumferentially spaced peripheral notches 44, each of which rotates into and out of cooperative engagement with the notch 38 of the associated bottle holder 36 to transfer bottles between the bottle holders 36 and the conveyor. The conveyor and transfer devices 40 and 42 are configured to operate in synchronism with the turret 30. Different supply and handling systems could be utilized for containers other than bottles.

Referring to FIGS. 1-5, the turret 30 includes a central shaft 50 and upper and lower disk arrangements 52 and 54. The shaft 50 is driven by an electric motor (not shown). The upper disk arrangement or "fill plate" 52 is fixed to the shaft 50 and has a segmented circular opening near its outer perimeter, each segment of which forms a fill opening 56 that is in alignment with a drop bucket 32 from above and with a funnel assembly 34 from below. Each fill opening 56 of this exemplary embodiment is about 15 cm long by about 10 cm wide. The drop buckets 32 are mounted on the fill plate 52 inboard of the fill openings 56. Mounts also are formed on or in the fill plate 52 for receiving funnel assemblies 34. These mounts may take the form of openings configured to cooperate with a magnetic quick-mount arrangement of the type described in commonly assigned U.S. Pat. No. 8,991,442, the subject matter of which is incorporated herein by reference in its entirely. Alternatively, each mount may comprise spaced holes for receiving spaced bolts that mount the funnel assemblies 34 on the bottom of the fill plate 52.

In the illustrated embodiment, the fill plate 52 is formed from stainless steel or a comparable durable, easily cleanable material. An annular rotating wear plate, formed by inner and outer annular rings 60 and 62, is mounted on top of the stainless-steel fill plate 52, with the annular rings 60 and 62 being located radially inboard and outboard of the fill openings 56, respectively. The rings 60 and 62 are formed of a material that is relatively hard and wear resistance but that has a relatively low coefficient of sliding friction. HDPE, Delrin® (an acetal homopolymer), and UHMW are examples of suitable materials but other materials may be utilized with similar characteristics based on availability and product interaction. An annular opening is formed between the inner and outer rings 60 and 62 over the fill openings 56. The drop buckets 32 are supported on the upper surface of the wear plate rings 60 and 62 and are attached to the hub 30 as discussed below.

Still referring to FIGS. 1-4, each drop bucket 32 is formed of a material that is durable and is easy to clean and that has a relatively low coefficient of sliding friction. Any of a variety of grades of stainless steel and materials with similar characteristics based on product interaction and environment would suffice. This material may be dimpled or otherwise modified in order to inhibit adhesion of tacky particles thereto. In this embodiment, each drop bucket 32 is generally trapezoidal in shape, having first and second or upstream and down opposed end walls 64 and 66 of the counterclockwise-rotating and inner and outer radial walls 68 and 70, each of which abuts an associated end of both end walls 64 and 66. The outer wall 70 of each drop bucket 32 is longer than the inner wall 68, and the end walls 64 and 66 are inclined relative to a radial bisector of the turret assembly, providing a trapezoidal shape that permits the drop buckets 32 to cover the entire circular area containing the drop buckets 32 without intervening gaps. The upper ends of the inner and outer end walls 64 and 66 are flared outwardly to serve as chutes that direct materials that may otherwise miss the drop bucket 32 into the interior of the drop bucket 32. A number, such as six, drop buckets could be provided in a semi-circular subassembly. A semi-circular flange 72 extends rearwardly from the drop buckets 32. As best seen in FIG. 5, each subassembly is held in place by a plurality of spring-loaded plungers 74 that extend through openings 76 in the flange 72 and that selectively engage corresponding recesses 78 in the inner wear plate ring 60 to lock the subassembly in place.

Figure 4:
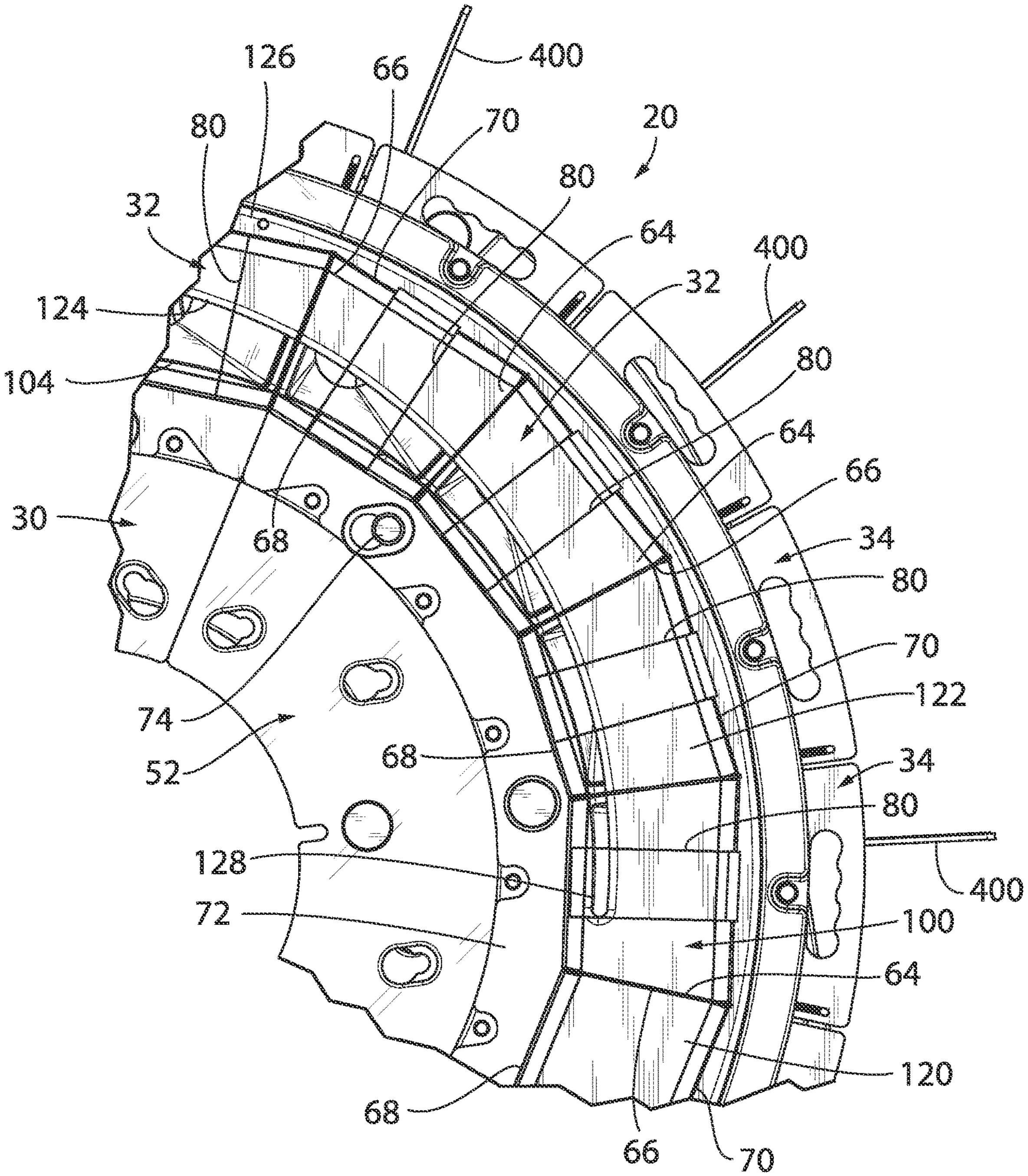
FIG. 4 is fragmentary top plan view of a portion of the rotary filling machine of FIGS. 1-3.
Figure 5:
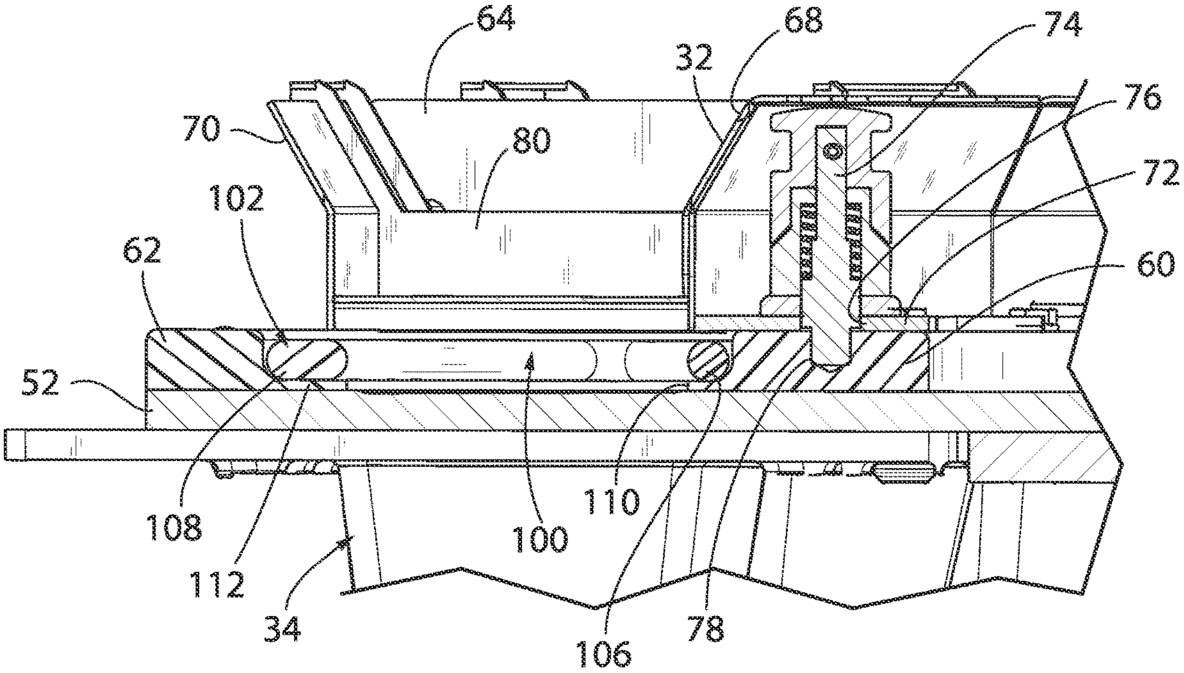
FIG. 5 is a sectional fragmentary radial elevation view of an upper portion of the rotary filling machine of FIGS. 1-3.

Still referring to FIGS. 1-4 and most particularly to FIG. 4, in order to prevent materials received from the rotary combination scale 22 from simply being pushed in front of the upstream end wall 64 of each drop bucket 32, which is of particular concern for relatively small fills, each drop bucket 32 may have at least one partition that extends at least generally vertically between the inner and outer walls 68 and 70 from the bottom of the drop bucket 32. Two equally-spaced partitions 80 are provided in the illustrated embodiment, each of which extends at least generally parallel with one another and with the front end wall 64 of the drop bucket 32. Three discrete chambers thus are formed within the drop bucket 32. During relatively small fills, most or all particles is a batch are dispensed into the downstream-most chamber. The benefits of this effect are discussed in more detail below.

Figure 6:
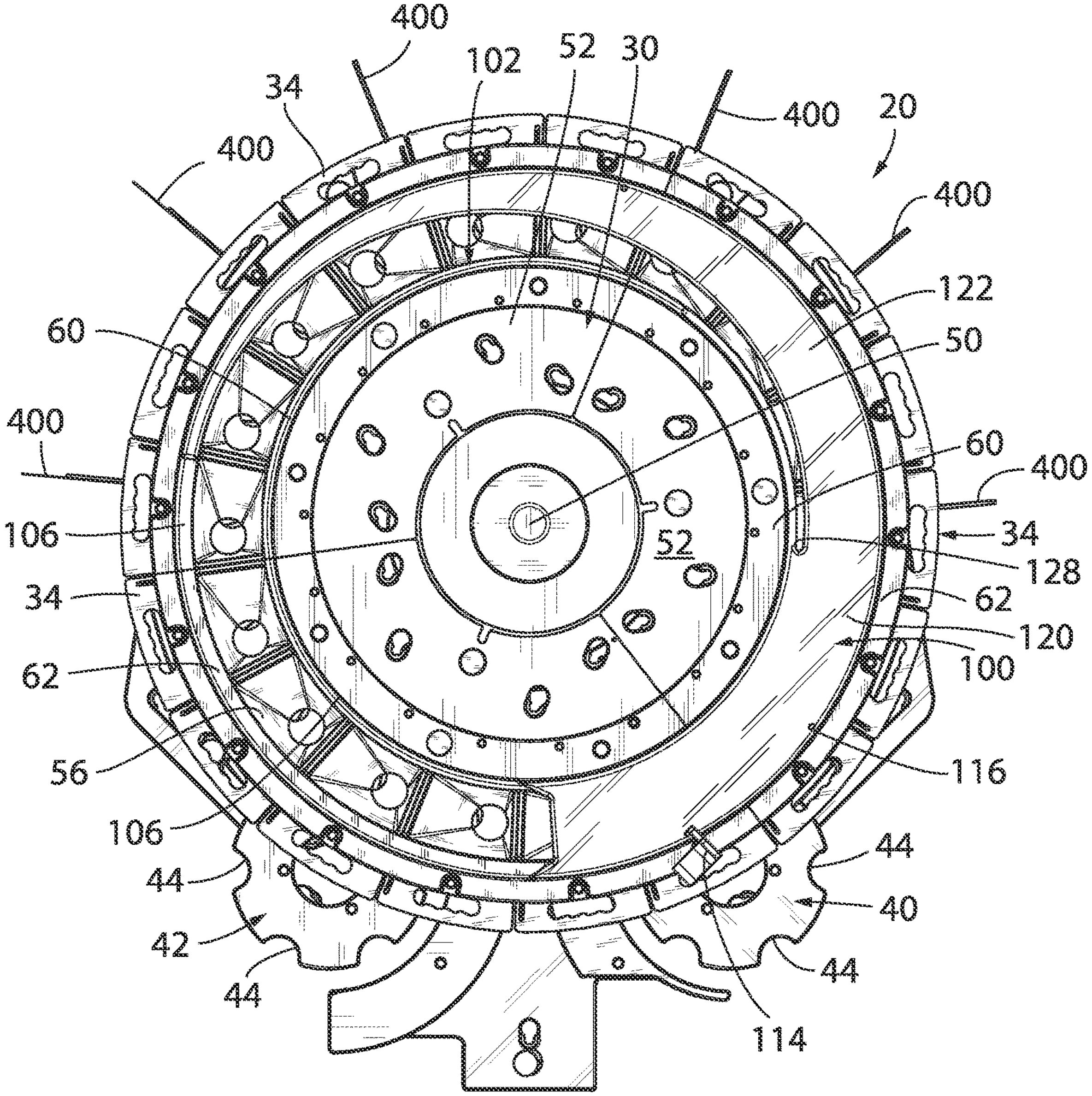
FIG. 6 is a top plan view of the rotary filling machine of FIGS. 1-3, showing the drop buckets removed.
Figure 7:
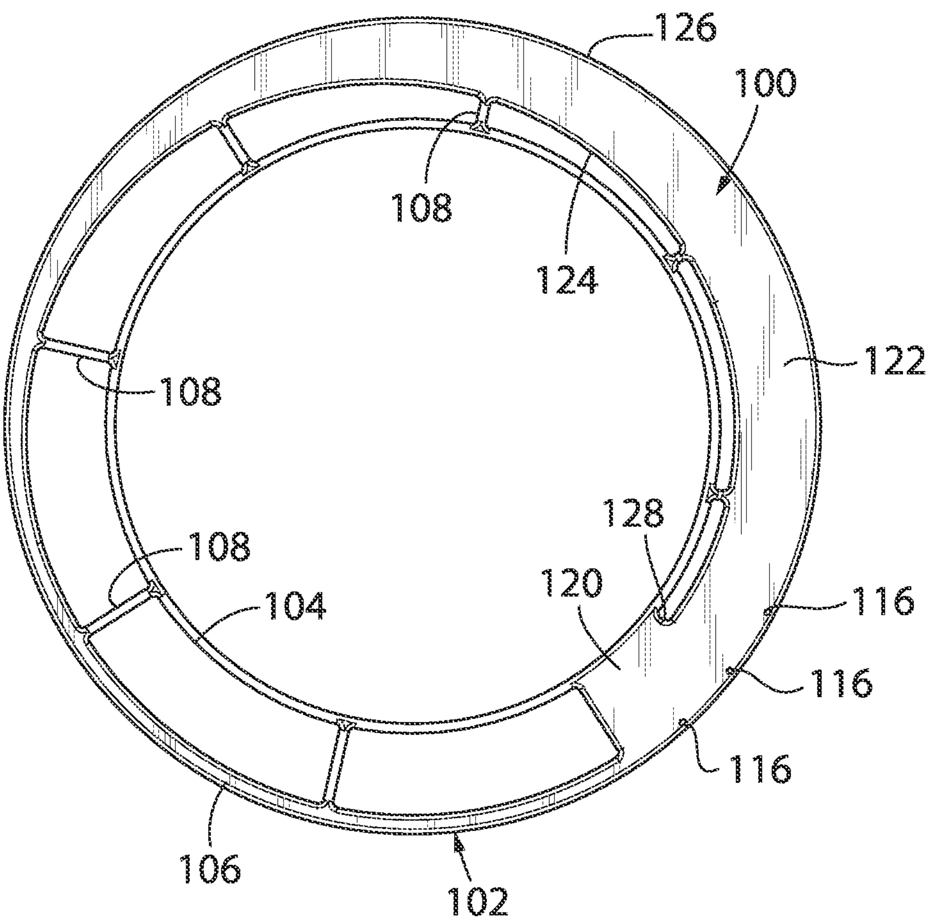
FIG. 7 is a top plan view of a slide plate of the rotary dispensing machine of FIGS. 1-3.

Referring to FIGS. 3-7, the slide plate or "drop plate" 100 is mounted in an upper recess between the inner and outer wear plate rings 60 and 62 so as to remain in place while the rings 60 and 62 rotate beneath it. The slide plate 100 may be formed of Delrin® or a similar material to facilitate this sliding contact while still providing the desired hardness and wear-resistance. It may, however, be formed of a separate material than that of the wear plate rings 60 and 62 to facilitate sliding movement of the two components relative to one another. For example, Delrin is particularly well-suited for the slide plate 100 if HDPE is used as the rings 60 and 62 of the wear plate. The slide plate 100 shown in FIG. 7 is formed integrally with an annular ring 102 that is segmented by a number of circumferentially spaced radial connecting arms 104. Inner and outer edges 106 and 108 of the ring 102 are supported on upwardly facing lips 110 and 112 formed on the outer peripheral surface of the inner wear plate ring 60 and the inner peripheral surface of the outer wear plate ring 62, respectively, as best seen in FIG. 5. The ring 102 prevents materials from accumulating on the lips 110 and 112 during a filling operation. The slide plate 100 is held stationary by a pin or similar device 114 (FIGS. 1, 3, and 6) that extends downwardly from a stationary mount into an opening formed in or through the slide plate 100. Accurate relative positioning of the slide plate 100 relative to the wear plate rings 60 and 62 can be provided by forming this opening in the form of a slot or by providing two or more spaced circular openings 116 as shown in FIG. 7.

Referring especially to FIG. 7, the radial diameter of the slide plate 100 is tapered over at least a portion of its length to cause the effective sizes of the fill openings 56 encountered by materials in the rotating drop buckets 32 to increase progressively downstream of the rotary combination scale dispenser 22. The tapered portion 122 thus effectively acts as a sliding trap door that causes the rotating drop buckets 32 to push particles into the fill openings 56 one at a time or in small groups rather than in a single clump. Hence, the upstream-most fill opening encountered by a filled drop bucket 32 is nearly fully covered, and the downstream fill openings 6 that thereafter are encountered are progressively exposed until the fill openings 56 downstream of the slide plate 100 are entirely exposed.

More specifically, as best seen in FIGS. 5-7, when viewed in a direction of turret rotation, the slide plate 100 includes an upstream portion 120 of uninform diameter and a downstream portion 122 that tapers progressively in diameter toward the downstream end thereof. In the illustrated embodiment in which the slide plate extends through an arc of about 290 degrees, the tapered portion 122 extends through the downstream-most 170-250 degrees of the slide plate 100. This taper may be continuous and uniform along part or all the tapered portion 122. In the illustrated embodiment, the tapered portion has an arc length of about 235 degrees. The tapered inner edge 124 has a radius of about 17 degrees over about the upstream-most 60 degrees of the tapered portion and of about 18.5 degrees over the remaining 175 degrees.

A notch 128 is formed in the inner edge 124 of the upstream end of the tapered portion 122 so that the leading end of the taper is located over the associated fill opening 56 rather than being disposed inboard of the fill opening. In the illustrated embodiment in which the fill openings 56 are about 100 mm wide, the "effective width" of the fill openings 56, as defined by the portions of the fill openings 56 that are not covered by the slide plate 100, increase in diameter from about 12 mm at the upstream-most end of the tapered portion 122 to the full 100 mm at the downstream-most end of the slide plate 100, where the slide plate is no-wider than the lip 112 on the outer wear plate ring 62.

Still Referring to FIGS. 5-7, the upstream end portion 120 of the slide plate 100 completely covers the underlying fill opening(s) 56 to provide a gapless "receiving surface" for receiving dispensed batches of particle received from the rotary combination scale 22 and for staging them for subsequent dispensing into the fill openings as they become exposed. In the illustrated embodiment, the upstream portion has an arc-length of about 55-60 degrees. This arc length could be considerably longer, if desired.

It should be noted that the ring 102 of FIG. 7 is not essential for support or operation of the slide plate 100. The slide plate 100 or a similarly-constructed slide plate could be provided in the form of a crescent or half-moon shaped element lacking a ring. The slide plate 100 is illustrated without a ring in FIG. 6.

Figure 8:
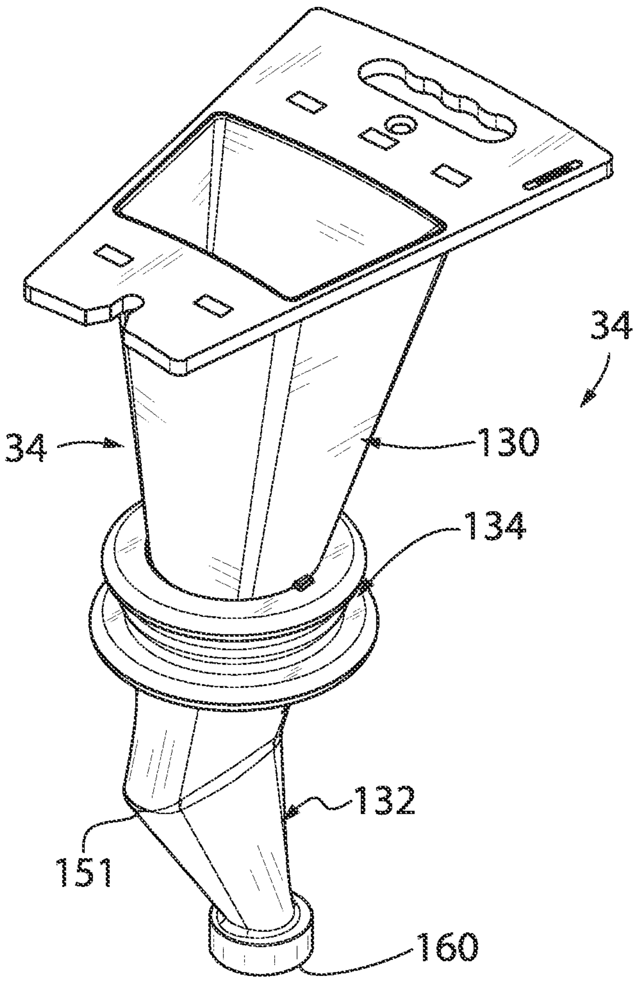
FIG. 8 is a perspective view of a funnel assembly of the rotary dispensing machine of FIGS. 1-3.
Figure 9:
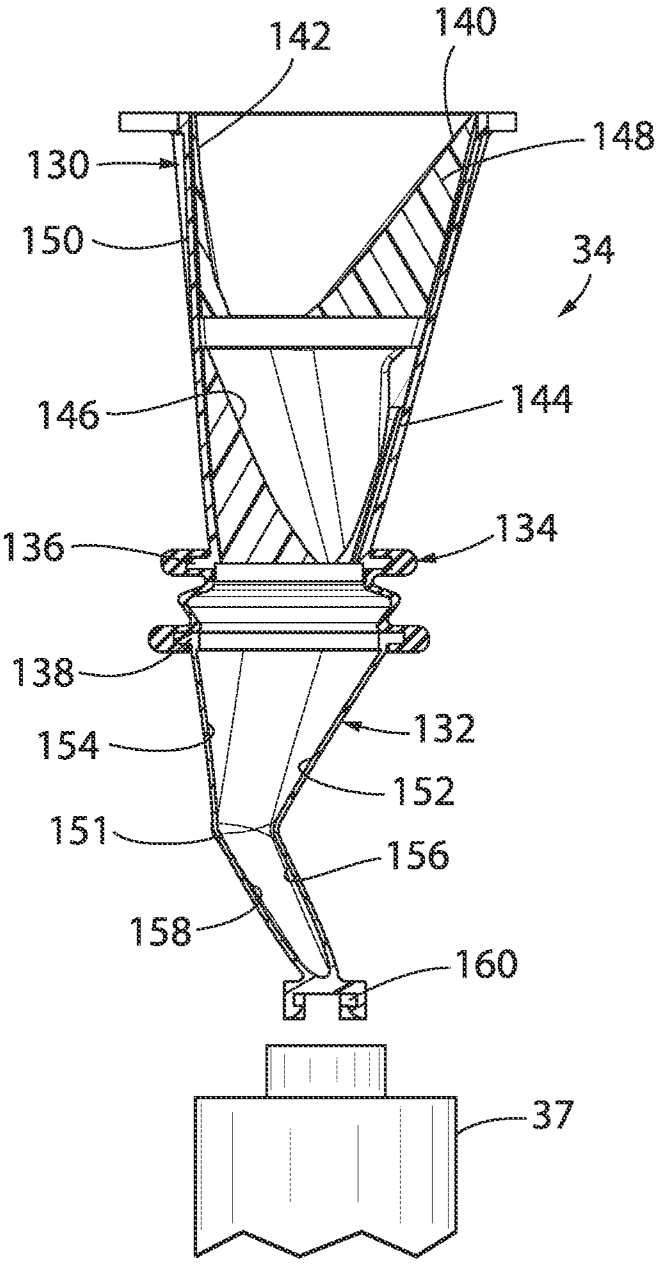
FIG. 9 is a sectional front elevation view of the funnel assembly of FIG. 8.
Figure 10:
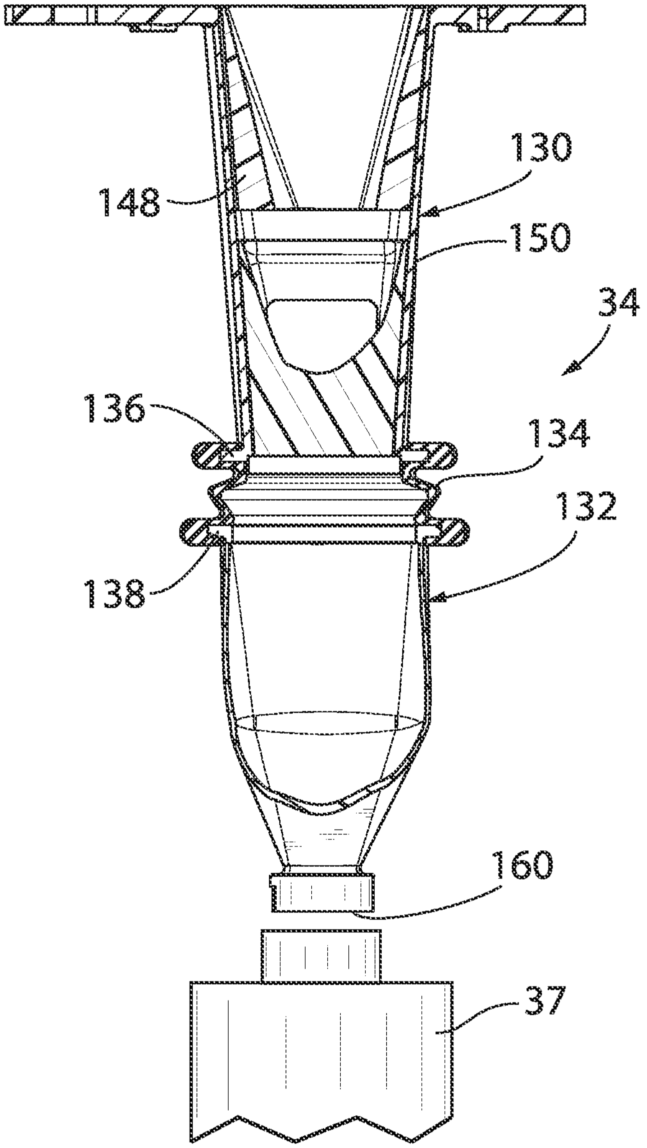
FIG. 10 is a sectional side elevation view of the funnel assembly of FIGS. 8 and 9.

Referring now to FIGS. 8-10, each funnel assembly 34 is configured to dispense materials falling through the associated fill opening 56 while further dilating those materials so that the materials are dispensed from a bottom dispensing outlet 160 of the funnel assembly 34 in or near a single file rather than in clumps. Outlet 160 typically has a diameter that is no greater than that of the inlet opening of the underlying container or, in the present non-limiting example, on the order of 20-40 mm and more typically of about 30 mm. The interior geometry of each funnel assembly 34 may be customized to accommodate the flow characteristics of the materials being dispensed. As a rule of thumb, the product flow path should be relatively simple for materials, like soft gummies, that are relatively sticky or tacky but that are not particularly prone to entanglement, and relatively complex for materials, such as cashews or hard gummies, that are not tacky or sticky but that are highly prone to entanglement or at least self-adhesion.

The funnel assemblies 34 shown in FIG. 8-10 are well-suited to dispense materials of the latter type. The illustrated funnel assembly 34 comprises upper and lower funnels 130 and 132 coupled to one another by a flexible bellows 134. The bellows 134 is retained in place by snap-fitting over a lower annular flange 136 on the upper funnel 130 and an upper annular flange 138 on the lower funnel 132. The upper funnel 130 may be universal to all dispensed materials or to broad classes of materials. The lower funnel 132 may be customized for a particular product, most notably including particle diameters, and thus may be thought of as a container adapter. The interior of each funnel assembly 34 may be of a non-linear and non-uniform volumetric taper so as to cause materials falling therethrough to zig-zag or bounce from side to side, breaking up clumps of entangled particles and further dilating or singulating the stream of flowing particles. A variety of geometries could achieve this effect, some more effectively for certain particles than others.

Referring specifically to FIG. 9, the interior of the upper funnel 130 defines an inner dilation camber bordered by an upper set of opposed first and second walls 140 and 142 and a lower set of first and second lower walls 144 and 146. Each set of walls may be provided on the interior surface of a removable insert 148 (or two or more stacked inserts) that is droppable into an outer shell 150 of the upper funnel 130 from above to permit customization for a particular application. The inserts 148, and the lower funnel 132, may be made from a durable wear resistant, low friction material such as urethane. The first wall 140 of the upper set is inclined downwardly and inwardly to a bottom edge located proximate the axial center of the upper funnel 130. At least most of the particles being swept into the funnel assembly 34 impinge on wall 140 and are defected to the opposed second wall 146 of the lower set. The second wall 146 of the lower set is inclined downwardly and inwardly to a bottom edge that directs particles to the inlet of the lower funnel 132. The second wall 142 of the upper set and the first wall 144 of the lower set act mainly as stops and see little or no product flow.

Still referring to FIG. 9, the bottom funnel 132 is kinked or "doglegged" at a central portion 151 thereof to define upper and lower portions that extend at an acute angle relative to one another. As with the upper funnel 130, the interior of the lower funnel 132 has first and second upper walls 152 and 154 and first and second lower walls 156 and 158. The first wall 152 of the upper set is inclined downwardly and inwardly to a bottom edge. The second wall 158 of the second set is inclined downwardly and inwardly to the bottom outlet 160 of the funnel assembly 34. Particles bouncing off the first wall 152 of the upper set impinge on the second wall 158 of the lower set, where they are further singulated as they flow toward the lower outlet 160. The second wall 142 of the upper set and the first wall 152 of the second set act mainly as stops and see little or no product flow.

Comparing FIG. 9 to FIG. 10, it can be seen that at a minimum the lower portion of the opening in the lower funnel 132 progressively narrows in one or "X" direction as shown in FIG. 9 and widens in the other or "Y" direction as shown in FIG. 10. This geometry helps prevent bridging of particles at the bottom outlet 160 by maintaining a relatively large flow area at the outlet despite presenting a taper in one direction for direction purposes.

Figure 12:
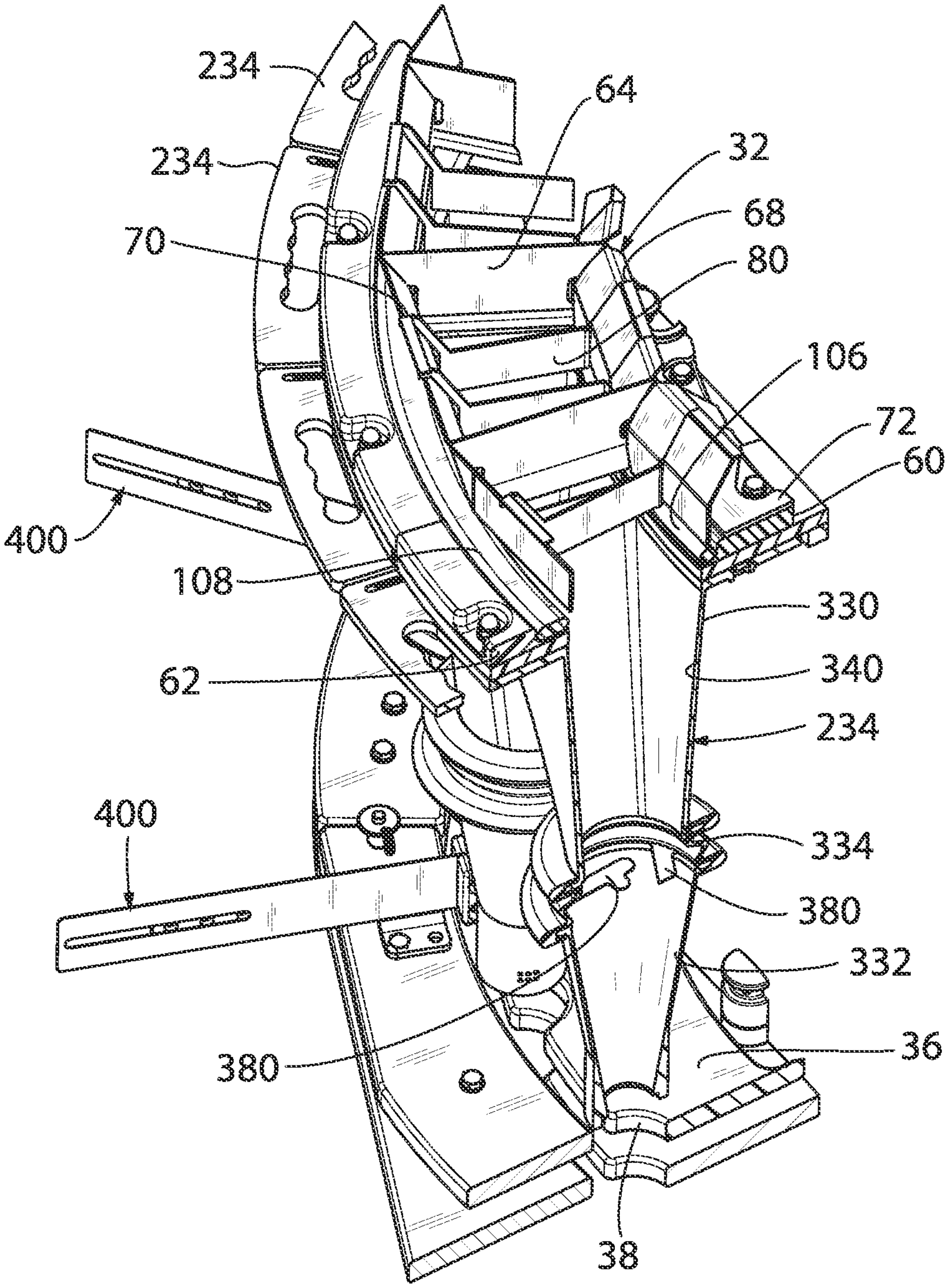
FIG. 12 is an isometric view of a funnel assembly constricted in accordance with another embodiment of the present invention.

Referring now to FIG. 12, a funnel assembly 234 may be fitted with inwardly-projecting fingers 380 that serve to be impacted by and break up any clumps that may survive the fall through the upper funnel 330. The funnel assembly 234 of this embodiment otherwise is similar to that of the first embodiment in that it has upper and lower funnels 330 and 332 coupled by a flexible bellows 334. The fingers 380 project inwardly into the baffle 334 from the outer perimeter thereof. Three such fingers (two of which are shown in FIG. 12) are provided in the illustrated embodiment, spaced equidistantly around the funnel assembly 234. Each finger has an inner, product engaging end that may have a tab thereon, and an outer end clamped between the upper surface of the bellows 334 and the lower surface of the mounting flange 336 of the upper funnel 330. The fingers 380 may be inclined relative to the horizontal at any desired angle to achieve the desired disrupting effect, and their angles of inclination may vary relative to one another. The fingers 380 may be formed, for example, of stainless steel or spring steel.

The material flow path in the funnel assembly 234 of FIG. 12 also is more direct or linear than in the funnel assembly 34 of FIGS. 8-10 in order to accommodate tackier or sticker materials that tend to adhere to any surface they contact. In this embodiment, both the upper and lower funnels 330 and 332 are at least primarily frustoconical in shape. Thus, the dogleg in the lower funnel 132 is eliminated. In addition, in the upper funnel 330, the first and second sets of walls of different relative inclinations are replaced by a single peripheral wall 340 of relatively uniform inclination.

Of course, the fingers 380 of FIG. 12, as well as other fingers or other elements protruding into the funnel assembly to help break up clumps, also could be provided in the funnel assembly of FIGS. 8-10.

Figure 11:
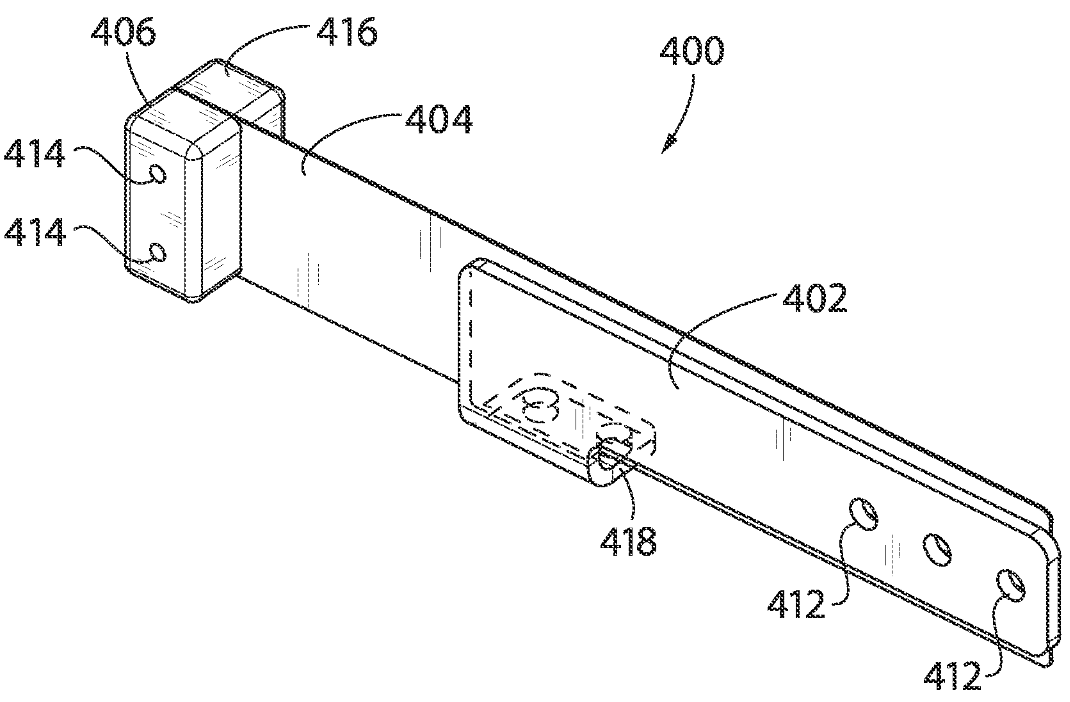
FIG. 11 is an isometric view of a funnel knocker assembly of the rotary filling machine of FIGS. 1-3.

Referring to FIGS. 3, 5, and 11, additional measures may be provided to impart shocks or vibrations to the funnel assemblies 34 to dislodge particles tending to bridge the funnels or stick to their inner wall. In the illustrated embodiment, these measures take the form of "funnel knockers" 400 that are impacted by the rotating funnel assemblies 34. Several such funnel knockers 400 could be spaced around the filling machine 20 in cooperation with some or all of the funnel assemblies that are actually dispensing product at any given time. Six such funnel knockers 400 are provided in this embodiment, spaced circumferentially around the filling machine 20 between the upstream end of the tapered portion 122 of the slide plate 100 where particles first fall into the underlying funnel assemblies 34 to a location disposed downstream of the downstream end of the slide plate 100.

Each funnel knocker 400 comprises a rigid mounting arm 402, a spring arm 404, and an impact block 406. Each mounting arm 402 has a base 408 bolted to a stationary support surface of the filling machine 20. Each spring arm 404 is relatively flexible and may, for instance, be formed of spring steel. Each spring arm 404 has a first end affixed to the mounting arm 402 and a second, free end positioned in the path of funnel assembly rotation. The radial position of the spring arm 404 relative to the mounting arm 402 may be adjustable, for example, by providing a slot 410 in the spring arm 402 for mating with spaced holes 412 in the mounting arm 02. The impact block 406 is mounted on the free end of the spring arm 404 by bolts 414 that extend through the impact block 406, through the spring arm 404 and into a mounting block 416 located behind the spring arm 404. This mounting block 416 provides additional mass to the structure being deflected by the rotating funnel assemblies 34. The impact block 406 is formed from a durable, wear resistant material such as Delrin. In operation, engagement of the impact block 406 with the revolving funnel assemblies resiliently deflects the free end of the spring arm 404 out of the path of funnel assembly rotation while imparting a shock to the funnel assemblies 34.

In operation, the turret 30 of the rotary filling machine 20 is driven to rotate while particles of bridgeable materials are deposited into the drop buckets 32 from the rotary combination scale dispenser 22. The particles in each drop bucket 32 initially fall onto the slide plate 100, and are swept into the fill openings 56 one at a time or in small groups as the drop bucket 32 rotates over the progressively-narrowing tapered portion 122 of the slide plate 100, thus tending to singulate the particles or, viewed another way, dilate the particle stream into individual particles or small clumps of particles. If the dispensed batch is relatively small so as not to fill the bottom of the drop bucket 32, the partitions hinder the "snow-plowing of particles" along the edge of the opening adjacent the slide plate 100 rather than the sweeping of those particles into the fill opening 56.

If the funnel assembly 34 is of the serpentine type shown in FIGS. 1-10, materials fulling into the funnel assembly 34 will further singulate or dilate as they bounce back and forth from the upper funnel 130 and the lower funnel 132 before falling out of the discharge outlet 160 and into the container 37. The falling particles are further singulated or dilated during this process, resulting of the dispensing of materials into the underlying container 37 in a stream of mostly-single particles. Impacts of the funnel knockers 400 against the funnel assembles 34 during this process will inhibit or prevent the adhesion of particles to any particular surface of the funnel assembly with attendant decreased risk of bridging.

If, on the other hand, the funnel assembly 234 is of the more traditional orientation as shown in FIG. 12, the materials simply drop through the funnels 330 and 332 and out of the discharge opening. Any clumps of materials will impact one or more the fingers 380, tending to singulate the particles falling past the fingers. Such fingers also could be provided in the funnel assemblies 34.

Figure 13:
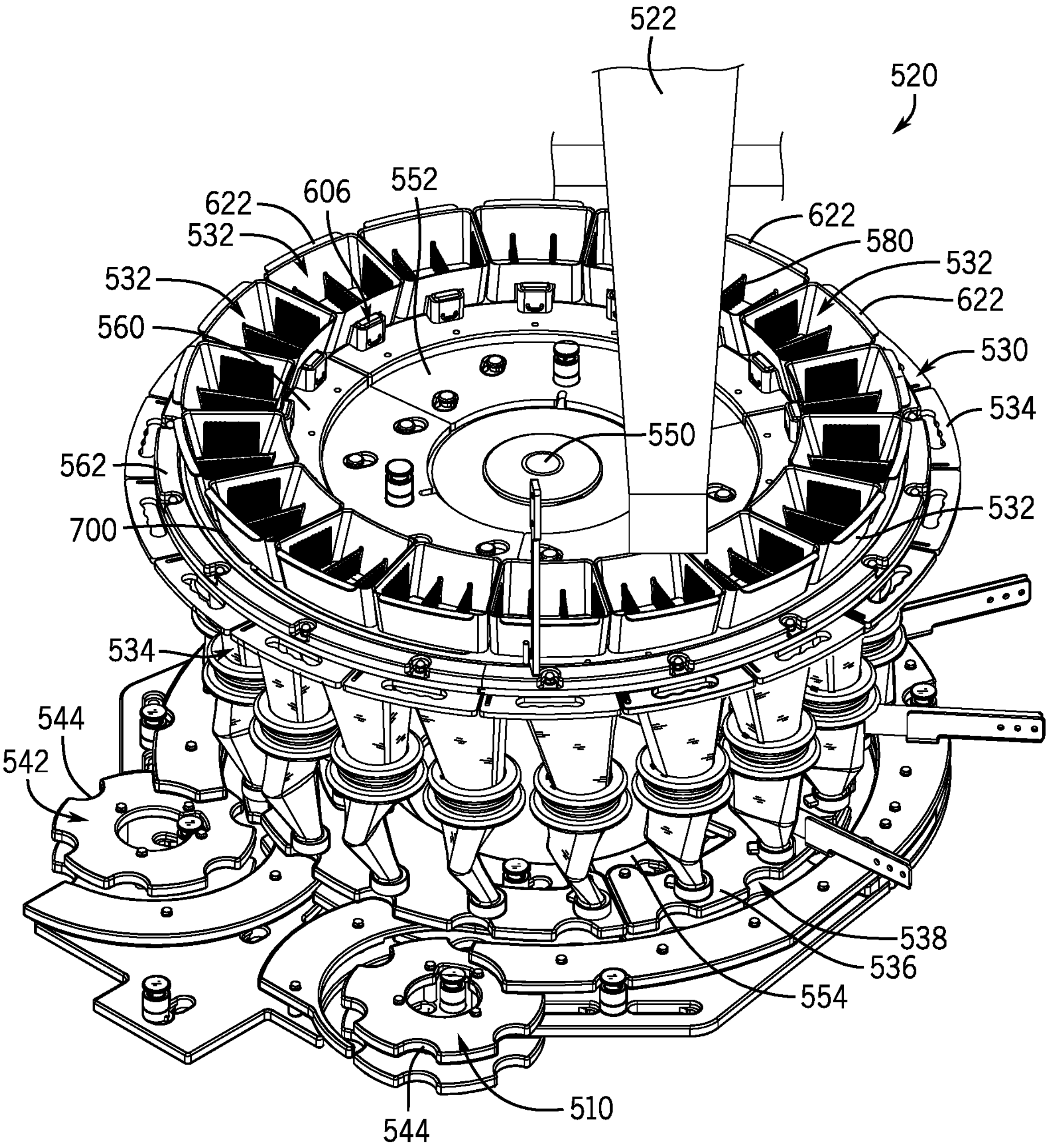
FIG. 13 is a perspective view of a rotary dispensing machine constructed in accordance with another embodiment of the present invention.

Now referring to FIG. 13, a rotary filling machine 520 is illustrated according to another representative embodiment of the invention. The filling machine 520 of this embodiment differs from the filling machine 20 of the first embodiment primarily in the construction of the drop buckets and their mating structures on the wear plate. Components of filling machine 520 corresponding to components of filling machine 20 are designated by the same reference numerals, incremented by 500. Filling machine 520 thus is configured to receive bridgeable dry materials (as that term is defined above) from a delivery system and to dispense the materials in a controlled manner (as that term is defined above) into underlying containers. The illustrated rotary filling machine 520 is optimized to fill bottles with gummies having a maximum dimension of about 2.25 cm and to dispense those gummies into a bottle having a fill opening diameter of approximately 4.25 to 4.50 cm. The machine configuration, and most notably the configuration of the funnel assemblies described below, could vary considerably depending upon the size and characteristics of the particles being handled and the fill opening diameter of the container being filled.

Still referring to FIG. 13, the rotary filling machine 520 includes a rotating turret 530 supporting a plurality of circumferentially spaced drop buckets 532. While the representative embodiment of the invention depicts 18 circumferentially spaced drop buckets 532, varying embodiments of the invention may include any number of circumferentially spaced drop buckets 532. The rotary filling machine 520 also includes a plurality of funnel assemblies 534. Each funnel assembly 534 is associated with one or more drop buckets 532. A number of container holders 536 are mounted on the bottom of the hub 530 beneath the funnel assemblies 534 to receive containers to be filled. In addition, a stationary slide plate 700, similar to slide plate 100, is mounted on the turret 530 vertically between the drop buckets 532 and the funnel assemblies 534 for dilating or singulating the flow of materials from the drop buckets 532 to the funnel assemblies 534.

The bottle holders 536, transferring devices 540 and 542 of this embodiment are identical to the corresponding components of the first embodiment, and need not be detailed here. The same is true for the turret assembly 530 including the central shaft 550, and a lower disk arrangement 554.

Differences between the upper disk arrangement or fill plate 552 and the fill plate 52 of the first embodiment are discussed below.

As will be discussed in further detail below, the drop buckets 532 are mounted on the fill plate 552 and attached to the fill plate 552 inboard of the fill openings 556. Mounts also may be formed on or in the fill plate 552 for receiving the funnel assemblies 534. As described above, these mounts may take the form of openings configured to cooperate with a magnetic quick-mount arrangement of the type described in commonly assigned U.S. Pat. No. 8,991,442, the subject matter of which is incorporated herein by reference in its entirety. Alternatively, each mount may include spaced holes for receiving spaced bolts that mount the funnel assemblies 534 on the bottom of the fill plate 552.

In the representative embodiment of the invention, the fill plate 552 is formed from stainless steel or a comparable durable, easily cleanable material. An annular rotating wear plate, formed by an inner annular ring plate 560 and an outer annular ring plate 562, is mounted on top of the fill plate 552, with the annular rings 560, 562 being located radially inboard and outboard of the fill openings, respectively. The inner annular ring 560 may also be referred to as an inner mounting ring 560. As in FIGS. 13 and 14, the inner mounting ring 560 may be in the form of multiple inner mounting ring segments for ease of installation. For instance, each inner mounting ring segment may be sized to receive six drop buckets 532.

The rings 560, 562 are formed of a material that is relatively hard and wear resistant but also has a relatively low coefficient of sliding friction. Examples include but are not limited to HDPE, Delrin® (an acetal homopolymer), and UHMW. An annular opening is formed between the inner ring 560 and the outer ring 562 over the fill openings. Each drop bucket 532 is supported on the upper surface of the mounting rings 560, 562 and are mounted to the turret 530 as discussed below.

In this exemplary embodiment of the invention, each drop buck 532 is formed of a material that is durable and easy to clean and that has a relatively low coefficient of sliding friction. The drop buckets also may be configured to be interchangeable for easy replacement. They thus may be formed of a resin material that can be formed by casting or molding. A variety of grades of cast urethane and materials with similar characteristics based on product interaction and environment would suffice and provide improved characteristics of cleaning and low coefficient of sliding friction over other materials, such as stainless steel. As shown in FIGS. 18-25, an exemplary drop bucket 532 may be generally trapezoidal in shape with a first (upstream) sidewall 564 and a second (downstream) sidewall 566. Additionally, each drop bucket 532 includes an inner radial wall 568 and an outer radial wall 570 that abut an associated end of the sidewalls 564, 566. The drop bucket 532 is open at its top and bottom to define a volume 618 bounded by the open top and bottom ends and the sidewalls 564, 566, 568, 570.

Figure 20:
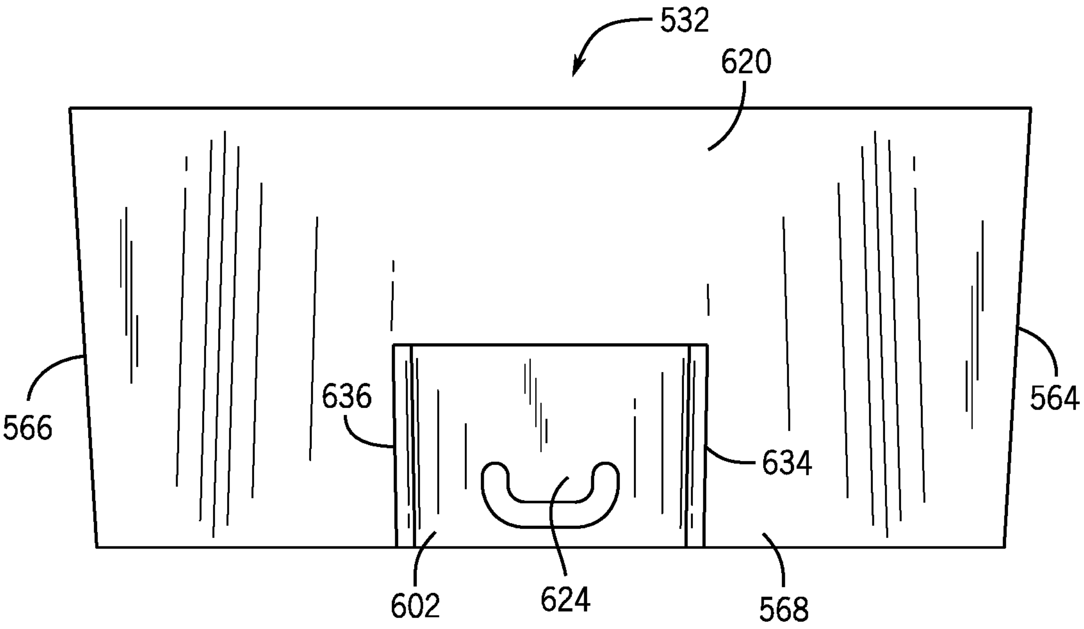
FIG. 20 is a front elevation view of the drop bucket of FIG. 18.
Figure 21:
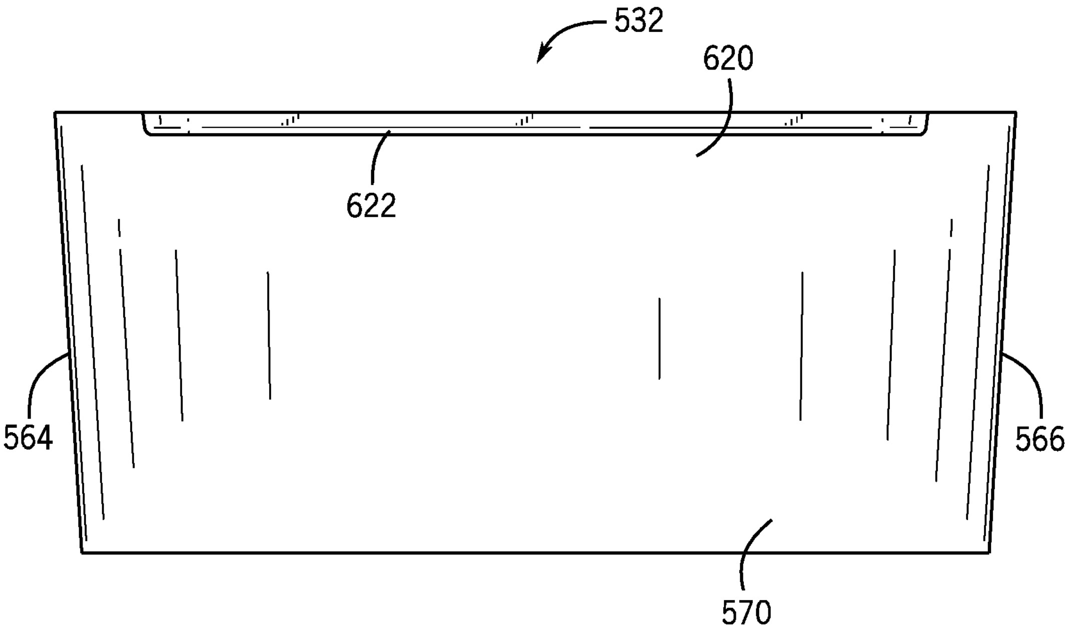
FIG. 21 is a rear elevation view of the drop bucket of FIG. 18.
Figure 22:
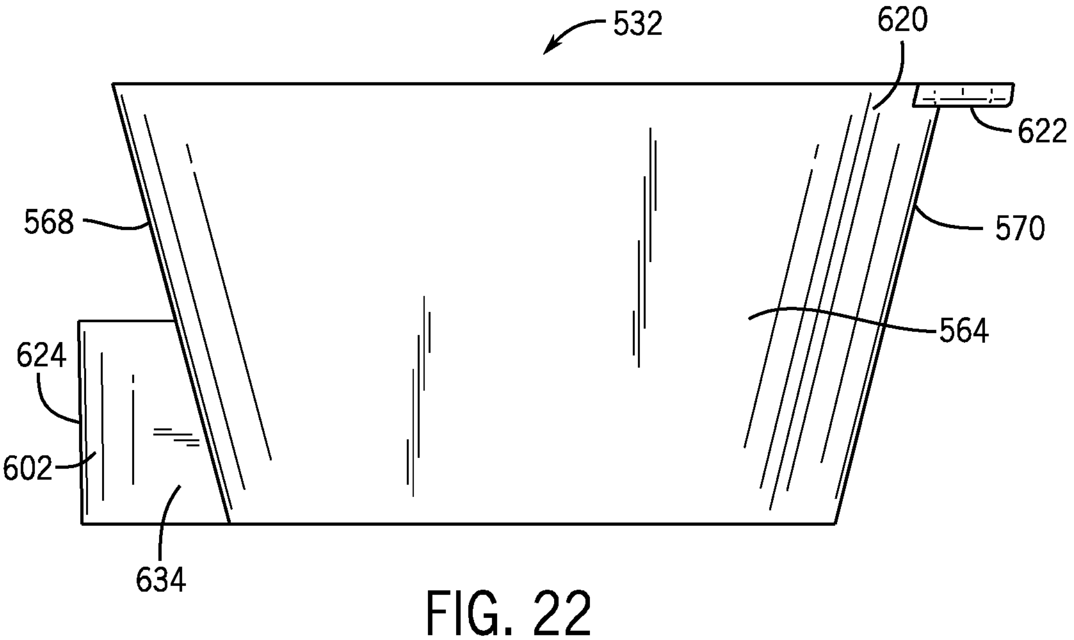
FIG. 22 is a first side elevation view of the drop bucket of FIG. 18.
Figure 23:
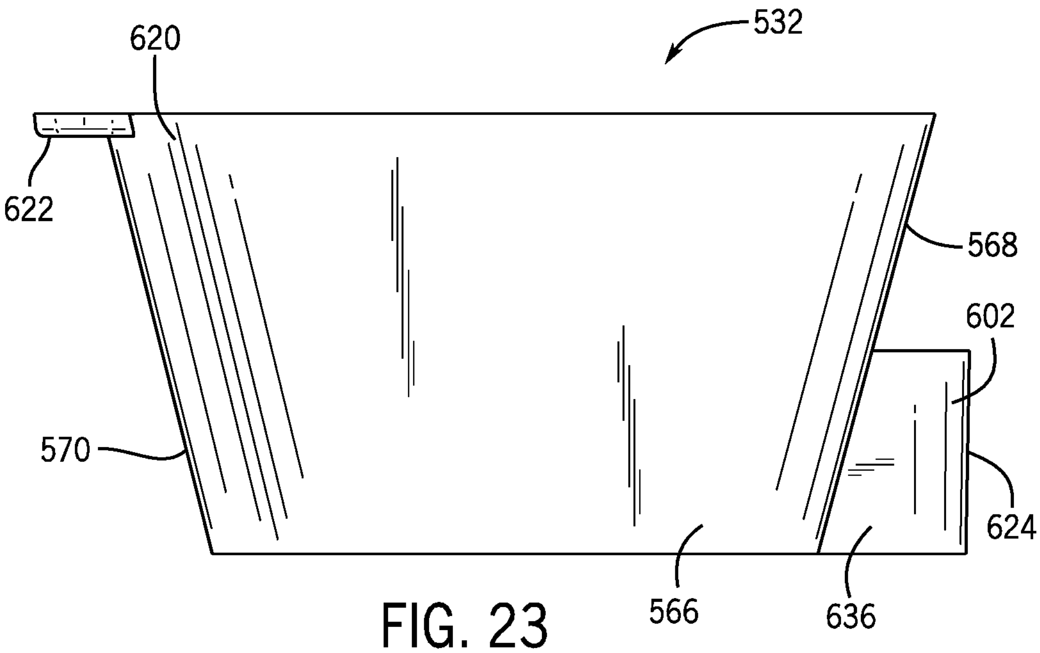
FIG. 23 is a second side elevation view of the drop bucket of FIG. 18.

The outer radial sidewall 570 of each drop bucket 532 is longer than the inner radial wall 568, and the sidewalls 564, 566 are inclined relative to a radial bisector of the turret assembly 530, which results in a trapezoidal shape that permits the drop buckets 532 to form an entire circle without any intervening gaps between drop buckets 532. As shown in FIGS. 22 and 23, the upper ends of the inner and outer radial walls 568, 570 are inclined inwardly from upper to lower ends to serve as chutes that direct materials that may otherwise miss the drop bucket 532 into the interior of the drop bucket 532. FIGS. 20 and 21 illustrate a similar, though shallower, inclination of the sidewalls 564, 566 to contribute to the directing or channeling abilities of the drop bucket 532.

In order to evenly distribute materials received from the rotary combination scale 522, each drop bucket 532 may include at least one partition 580 extending at least generally vertically between the inner and outer radial walls 568, 570 to divide the volume 618 of the drop bucket 532 into numerous chambers 600. While the illustrated embodiment of the invention depicts two equally-spaced, vertically extending partitions 580 and three chambers 600, varying embodiments of the invention may include any number of partitions 580 and chambers 600. In the representative embodiment of the invention, the partitions 580 are inclined relative to a radial bisector of the turret 530, similar to the sidewalls 564, 566, thus dividing the drop bucket 532 into three discrete chambers 600. The height of each partition 580 may be selected based on factors including the size, shape and adhesive characteristics of the materials being dispensed. In the illustrated embodiment, each partition 580 extends about 25-100% and, more typically about 40-60%, of the height of the drop bucket 532. In terms of dimensions, the height of the walls of each drop bucket typically is 3.25 in., and the height of each partition 80 typically is 1.50 in.

Figure 15:
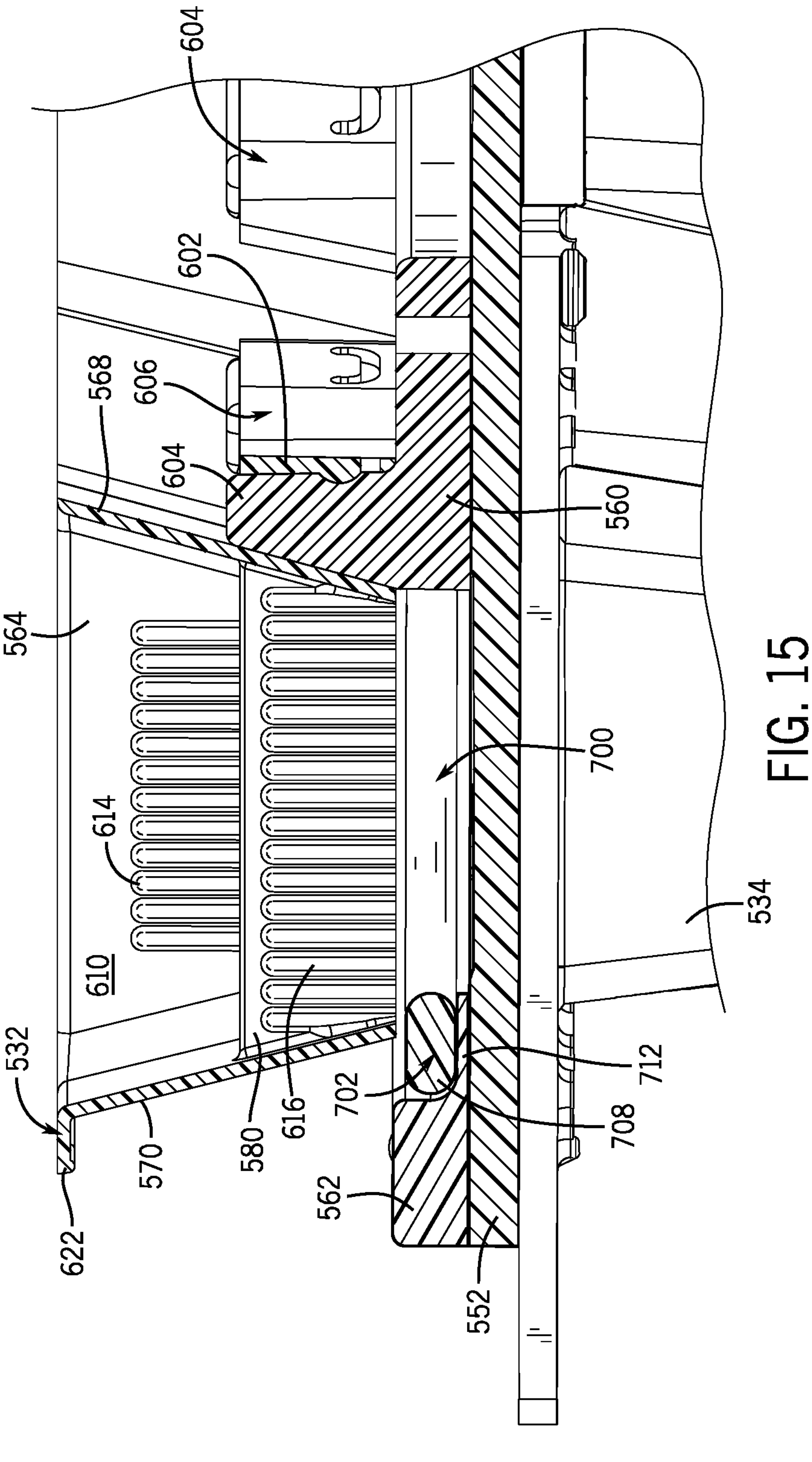
FIG. 15 is a sectional fragmentary radial elevation view of an upper portion of the rotary filling machine of FIG. 13.
Figure 16:
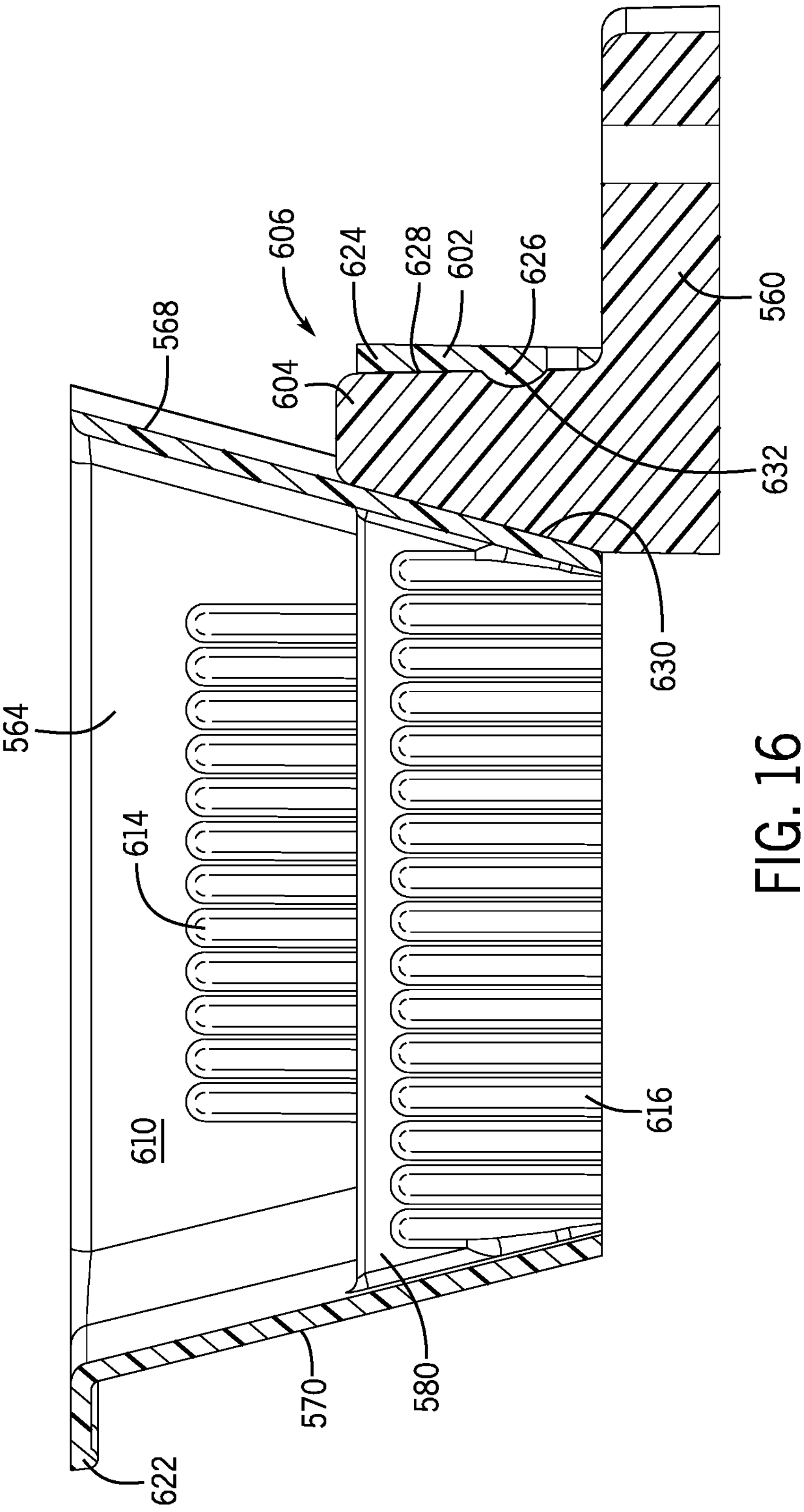
FIG. 16 is a sectional elevation view of a drop bucket and mounting structure of the rotary filling machine of FIG. 13.
Figure 17:
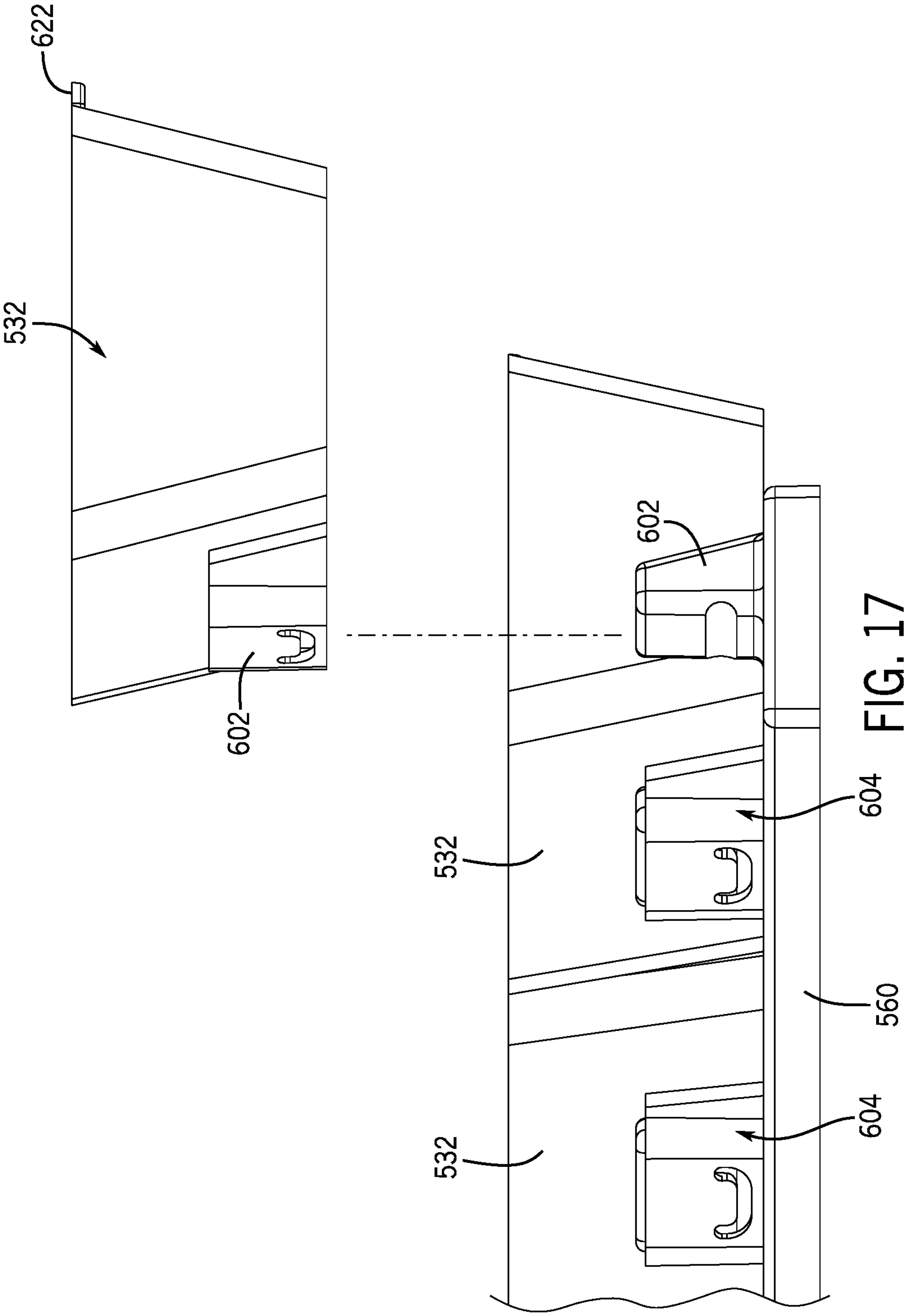
FIG. 17 is a side elevation view of the rotary filling machine of FIG. 13 showing a drop bucket spaced apart from a corresponding portion of the frame.
Figure 18:
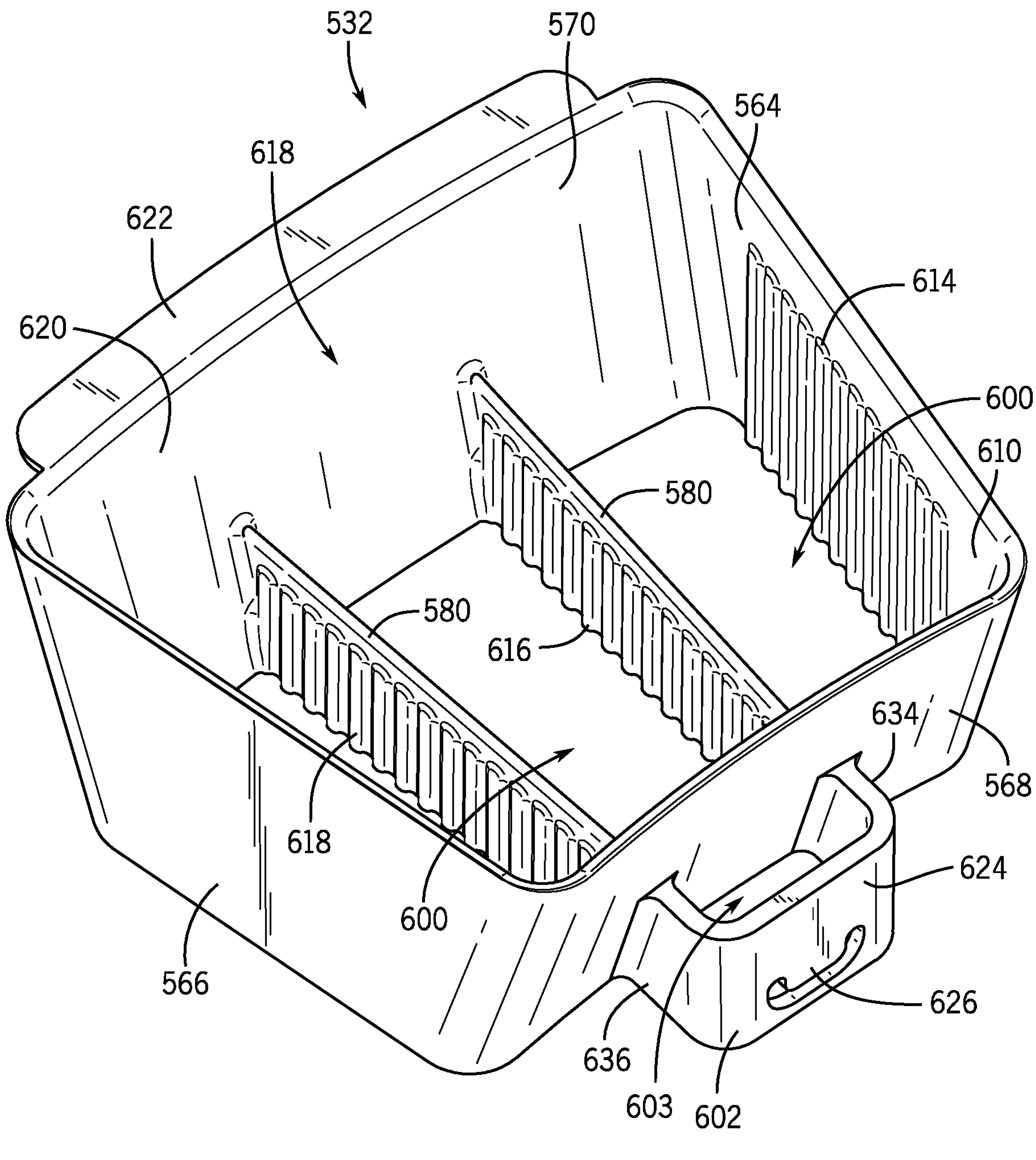
FIG. 18 is a front isometric view of a drop bucket of the rotary filling machine of FIG. 13.
Figure 19:
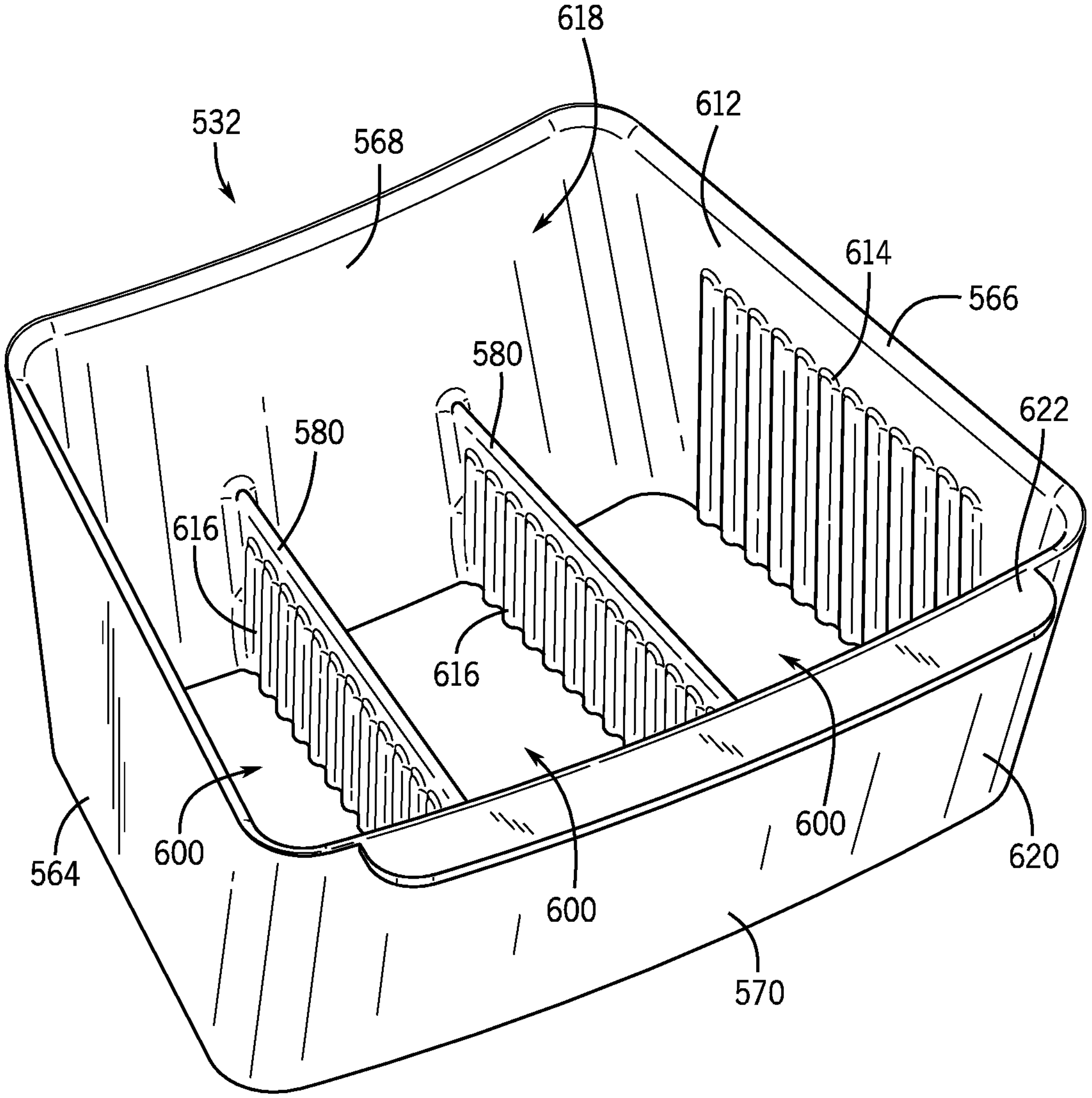
FIG. 19 is a rear second isometric view of the drop bucket of FIG. 18.

As shown in the cross-sectional views of FIGS. 15-16, a bottom edge of each partition 580 may be aligned along the same horizontal plane as a bottom edge of the walls 564, 566, 568, 570 of the drop bucket 532. As a result, a top edge of each partition 580 is not aligned along the same horizontal plane as a top edge of the walls 564, 566, 568, 570 of the drop bucket 532.

Figure 24:
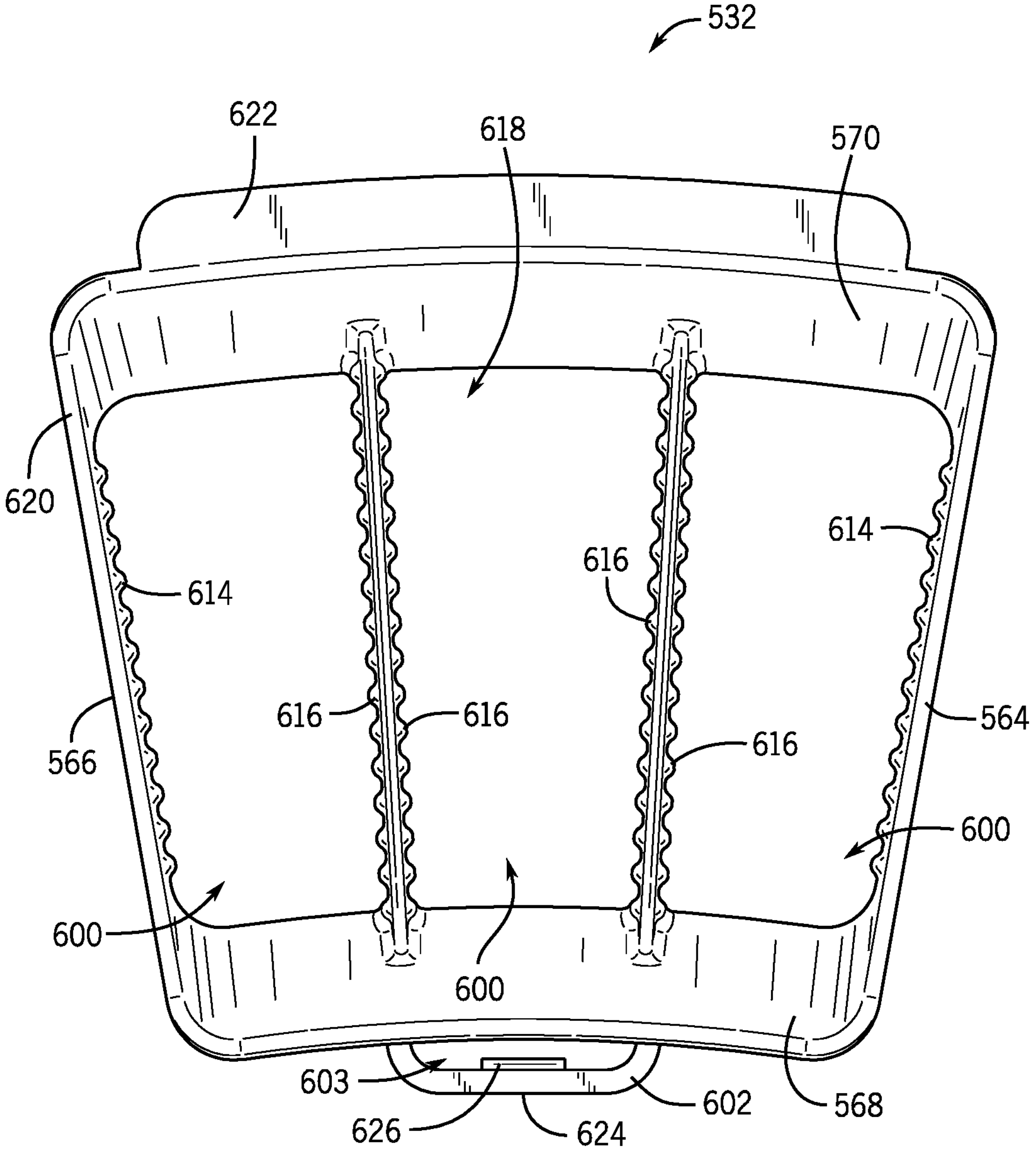
FIG. 24 is a top view of the drop bucket of FIG. 18.
Figure 25:
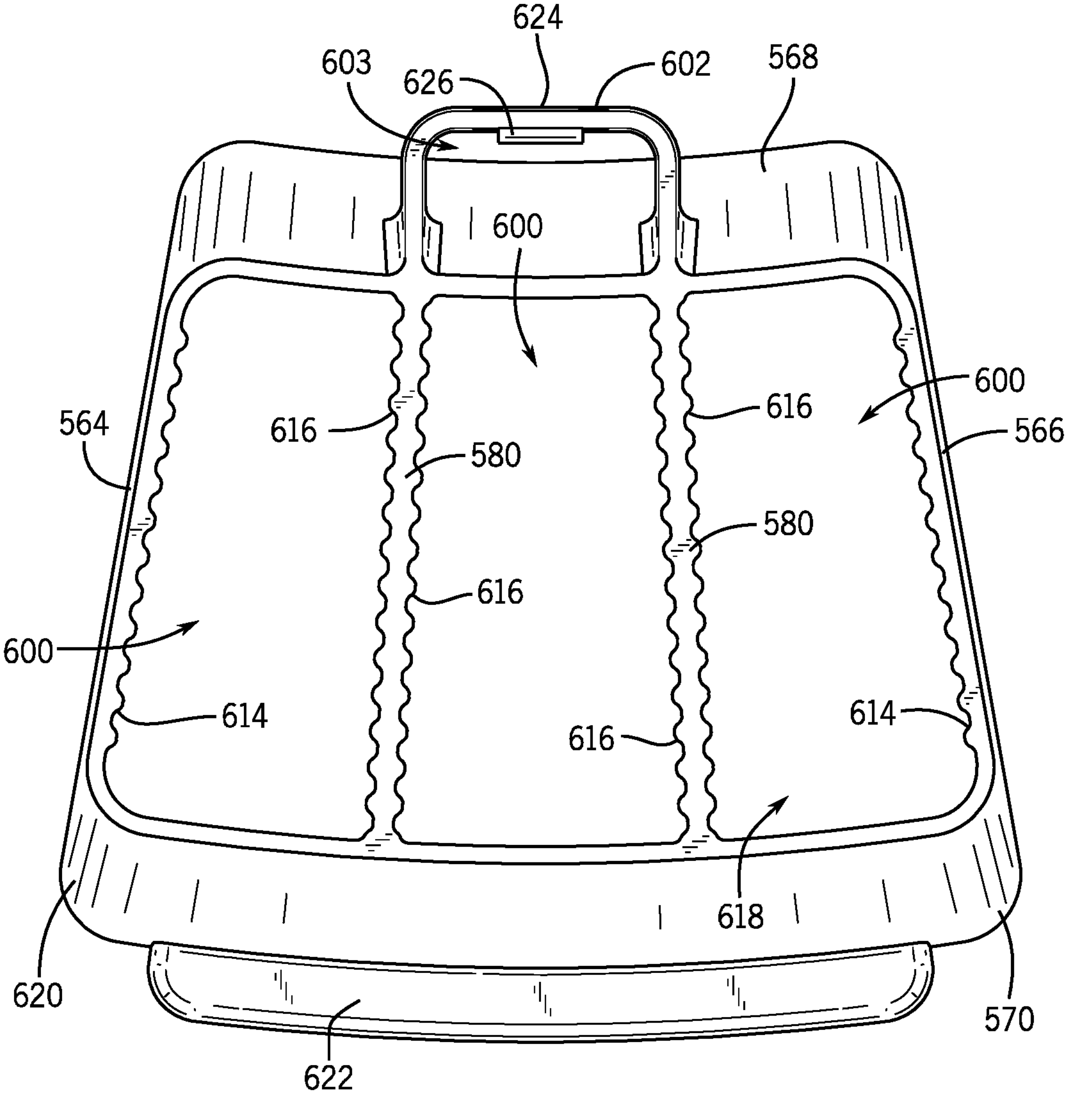
FIG. 25 is a bottom view of the drop bucket of FIG. 18.

At least some of the inner surfaces of each drop bucket are formed with protrusions that inhibit the adhesion of materials to the surfaces of the drop bucket 32. These protrusions could take the form of dimples, bulges, etc. In the illustrated embodiment, an inner surface 610 of the first sidewall 564 and an inner surface 612 of the second sidewall 566 include protrusions in the form of ribs or ridges 614 formed thereon. In addition, each partition 580 may include protrusions in the form of vertically extending, horizontally spaced ribs or ridges 616 formed on one of or both sides of the partition 580. As a result, each chamber 600 is at least partially surrounded by ridges 614 and/or ridges 616, as shown in FIGS. 24 and 25. In varying embodiments of the invention, each drop bucket 532 may include any number of combinations of ridges 614, 616 and other protrusions formed on the surfaces of the sidewalls 564, 566 and partitions 580. The ridges 614, 616 provide a contour to the sidewalls 564, 566 and partitions 580 that reduces the size of the planar contact surface of the sidewalls 564, 566 and partitions 580 and also effectively breaks that planar contact surface into non-contiguous sections or portions, thus inhibiting the adhesion of dispensed materials to the sidewalls 564, 566 and partitions 580 of the drop bucket 532 as the dispensed materials transition from the drop bucket 532 to the associated funnel assembly 534. As a result, the ridges 614, 616 assist in preventing buildup up the dispensed material within the drop bucket 532.

The total surface area of the ridges or other protrusions relative to the surface areas of the partition surfaces and wall surfaces may vary from application to application based on, the adhesive characteristics, shapes, and/or sizes of the materials being dispensed. Typically, the ridges will form 10-90% of the surface area of the partitions 580 and sidewalls 564 and 566. More typically, the ridges 616 of the partitions 580 form 65-90% of the surface area of the partitions 580, and the ridges 614 of the sidewalls 564, 566 form 50-90% of the surface are of the sidewalls 564, 566. The ridges 614, 616 may extend at least the majority of the length of the partitions 580 and sidewalls 564 and 566. In the illustrated embodiment, they extend at least 80% of the height, if not essentially the entire height, of the partitions 580 and at least 70% of the height of the sidewalls 565, 566. The depth and width of each ridge, and the spacing between ridges (and thus the number of ridges on a given surface) also may vary dramatically depending on the application. In the present embodiment, 16 evenly-spaced ridges 614 are provided on the surface of each sidewall 564, 566, while 12 evenly-spaced ridges 616 are provided on each surface of each partition 580. Each ridge typically has a depth of 0.100 in and a width of 0.100 in. In varying embodiments of the invention, each individual ridge of the partition and sidewalls may have varying depths and/or widths to create a further varying contact surface plane within the drop bucket 532. Toward this end, the ridges may be rectangular when viewed in plan (from above or below). However, to enhance the effect of reducing the surface area formed by the total surfaces of the ridges 614 and 616 lying in a given plane, the ribs may be frusto-conical, or convex. As best seen in FIGS. 24 and 25, the ridges 614 or 616 on a given surface are generally convex so as to take on a waveform appearance when viewed from above or below in aggregate.

Figure 14:
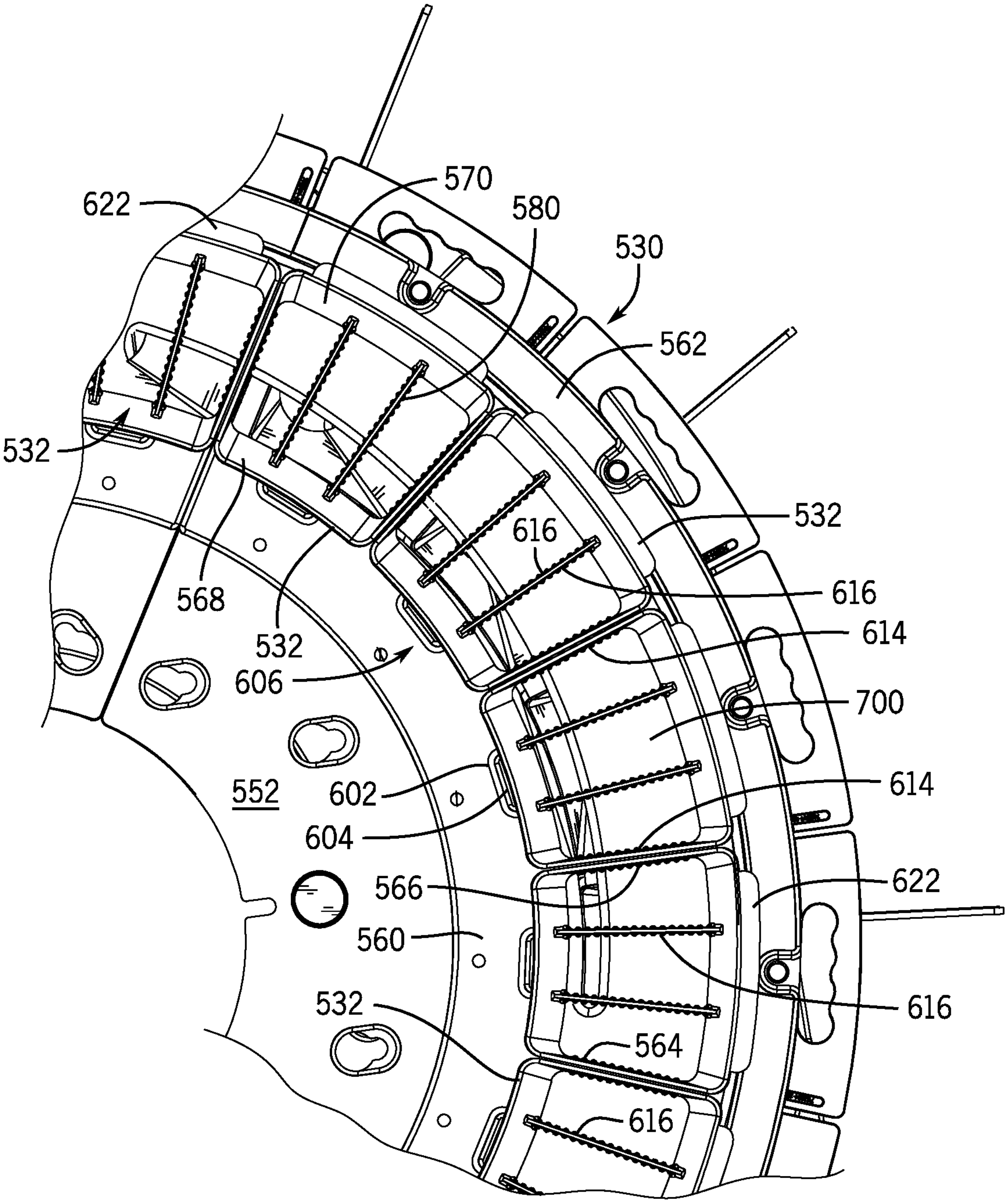
FIG. 14 is fragmentary top plan view of a portion of the rotary filling machine of FIG. 13.

Referring to FIG. 14, each drop bucket 532 is mounted on the underlying support ring by a coupler 606 that allows for the drop bucket 532 to be mounted and removed from the inner mounting ring 560 without the use of tools. Each coupler 606 includes a first connector 602 on the drop bucket 532 and a second, mating connector 604 on the mounting ring 560. In the representative embodiment of the invention, the first connector 602 is in the form of a socket 602 extending away from the inner radial wall 568 of the drop bucket 532. When the drop bucket 532 is mounted to the fill plate 552, the socket 602 extends inward toward the center of the assembly 520. The socket 602 is configured to interfit with the second connector 604 disposed on the mounting ring 560. In the exemplary embodiment of the invention, the second connector 604 is in the form of a post 604 extending upward from the mounting ring 560. The socket 602 of each drop bucket 532 surrounds a cavity 603 disposed between a mounting wall 624 of the socket 602 and the outer surface of the inner radial wall 568. The cavity 603 is configured to receive the post 604 extending upward from the inner mounting ring 560.

As shown in the cross-sectional view of FIG. 16, each post 604 extends generally vertically upward from an upper surface of the inner mounting ring 560 and is sized and shaped to be received in the cavity 603 of the socket 602. That is, certain surfaces of the post 604 may be oriented vertically or at an angle to compensate for the orientation of the surface upon which they make contact. For instance, an inner surface 628 of the post 604 may be oriented vertically and aligned with the mounting wall 624 of the socket 602, while an outer surface 630 of the post 604 may be oriented at the same angle as the inner radial wall 568 of the drop bucket 532. Preferably, the cavity 603 of the socket 602 may have a width of 1.750 in and the post 604 may have a width of 1.754 in to accommodate the post 604 within the cavity 603 of the socket 602.

It is also contemplated that the width of the cavity 603 and post 604 may vary along the height of the cavity 603 and the post 604, thus forming a taper. That is, the width of the post 604 may be larger adjacent the upper surface of the inner mounting 560 and smaller at the top edge of the post 604. In such instances, the shape of the cavity 603 may be designed to match the shape of the post 604.

Similar to the width described above, the depth of the cavity 603 and the post 604, as best shown in the cross-sectional views of FIGS. 15 and 16, is preferably offset where the depth of the cavity 603 is 0.005 in larger than the depth of the post 604. As described above, this offset accommodates the post 604 within the cavity 603 and allows for a user to more easily mount and remove the drop bucket 532 from the mounting ring 560. More preferably, the depth of the post 604 adjacent the upper surface of the mounting ring 560 is 1.120 in, while the depth of the cavity 603 at its lower edge is 1.125 in.

In the illustrated embodiment of the invention, the mounting wall 624 of the socket 602 includes a catch that engages a mating structure on the post when the drop bucket is in its-fully mounted position. The catch of the present embodiment includes a protrusion 626 extending into the cavity 603 of the socket 602, while the mating structure includes a recess 632 formed in the post 604. The protrusion 626 is configured to interfit with a recess 632 formed in the inner wall 628 of the post 604. When the drop bucket 532 is mounted to the inner mounting ring 532 by aligning the socket 602 with the post 604, the protrusion 626 extends into the recess 632 in order to secure the drop bucket 532 in place during a filling operation of the machine 520. The protrusion 626 and the recess 632 may have complimentary rounded surfaces with a common radius. The protrusion 626 and the recess 632 may each have a depth of 0.001 in.

As shown in FIGS. 18-24, each drop bucket 532 may also include a handle 622 to facilitate its mounting and removal. In the illustrated embodiment, then handle 622 of each bucket 532 is cast integrally with the remainder of the drop bucket and extends outward from the outer radial wall 570 of the drop bucket 532. The handle 622 extends from an upper edge of the outer radial wall 570.

The cross-sectional view of FIG. 15 further illustrates the slide plate or "drop plate" 700 that is mounted in an upper recess between the inner and outer plate ring plates 560, 562. In turn, the slide plate 700 remains in place while the ring plates 60, 62 rotate beneath it. The slide plate 700 is identical in construction and operation to the slide plate 100 of the first embodiment. Slide plate 700 thus includes a segmented integrally formed annular ring 702, and an outer edge 708 of the ring 702 supported on an upwardly facing lip 712.

Variations and modifications of the foregoing are within the scope of the present invention. Some such variations and modifications are discussed above. Others will become apparent from the appended claims. Many changes and modifications could be made to the invention without departing from the spirit thereof. The scope of these changes and modifications will become apparent from the appended claims.

We claim:

1. A rotary filling machine comprising:

a rotatable fill plate including fill openings defined therein;

a plurality of circumferentially spaced drop buckets mounted above the fill plate and configured to rotate with the fill plate, each drop bucket having:

a plurality of sidewalls surrounding a volume, the sidewalls including an inner radial wall, an outer radial wall, a first sidewall, and a second sidewall, wherein the volume is bounded from above by a top opening and from below by a bottom opening;

a wear plate located over the fill plate and disposed below the drop buckets; and a plurality of couplers, each coupler including a first connector extending from an outer surface of the inner radial wall of an associated drop bucket at a location adjacent of a bottom end of the drop bucket and a second connector extending upward from the wear plate, wherein the first and second connectors are configured to interfit with each other to mount the drop bucket on an upper surface of the wear plate.

2. The rotary filling machine of claim 1, wherein the wear plate includes an outer mounting ring located radially outboard of the fill openings of the fill plate and an inner mounting ring located radially inward of the fill openings, the second connector of the coupler extending upward from the inner mounting ring.

3. The rotary filling machine of claim 2, wherein the first connector of each coupler comprises a socket extending from an outer surface of the inner radial wall of the associated drop bucket and forming a cavity; and wherein the second connector of each coupler comprises a post extending upward from the inner mounting ring and configured to be disposed within the cavity of the socket when the drop bucket is mounted to the inner mounting ring.

4. The rotary filling machine of claim 3, wherein the socket of each coupler includes a protrusion, which extends into the cavity, and the post includes a corresponding recess formed in a surface thereof.

5. The rotary filling machine of claim 2, further comprising a plurality of funnel assemblies mounted below the wear plate and configured to rotate with the wear plate, each funnel assembly having an upper inlet positioned beneath the bottom opening of a corresponding drop bucket, and a lower dispensing outlet.

6. The rotary filling machine of claim 1, wherein each drop bucket has at least one partition that extends between the inner and outer radial walls to divide the volume of the drop bucket into discrete chambers.

7. The rotary filling machine of claim 6, wherein each drop bucket further includes protrusions formed on at least one of a side surface of the at least one partition, an inner surface of the first sidewall, and an inner surface of the second sidewall, the protrusions on each side surface being dimensioned and configured to provide a contour to that surface that reduces the proportion of that surface that lies in a plane and that breaks that surface into a plurality of non-contiguous co-planar surfaces.

8. The rotary filling machine of claim 7, wherein the protrusions are in the form of vertically-extending ridges.

9. The rotary filling machine of claim 8, wherein the ridges form 65-90% of the surface area of the at least one partition and 50-90% of the surface area of the first and second sidewalls.

10. The rotary filling machine of claim 1, wherein each drop bucket is formed from a cast or molded resin material.

11. The rotary filling machine of claim 10, wherein each drop bucket further includes a handle extending outward from the outer radial wall of the drop bucket.

12. The rotary filling machine of claim 1, wherein the upper surface of the wear plate extends horizontally along an entire extent thereof.

13. A drop bucket for a rotary filling machine to direct materials from a discharge opening to a funnel located beneath the drop bucket, the drop bucket comprising:

a body having an open top that is configured to be in alignment with the discharge opening during a portion of a rotational phase of the rotary filling machine, an open bottom that is configured to discharge materials into the funnel, and a plurality of walls including an inner radial wall, an outer radial wall, a first sidewall, and a second sidewall; and a coupler including a first connector extending from an outer surface of the inner radial wall of an associated drop bucket at a location adjacent of a bottom end of the drop bucket and a second connector extending upward from a mounting ring of the rotary filling machine, wherein the first and second connector are configured to interfit with each other to mount the drop bucket to the mounting ring.

14. The drop bucket of claim 13, wherein the first connector comprises a socket extending from an outer surface of the inner radial wall and forming a cavity; and wherein the second connector is a post extending upward from the mounting ring and configured to be disposed within the cavity of the socket when the drop bucket is mounted to the rotary filling machine.

15. The drop bucket of claim 14, wherein one of the socket and the post includes a protrusion configured to interfit with a corresponding recess of the other of the socket and the post.

16. The drop bucket of claim 15, wherein the socket includes the protrusion, and the post include the corresponding recess formed in a surface thereof.

17. The drop bucket of claim 13, wherein each drop bucket further includes a handle extending outward from the outer radial wall of the drop bucket.

18. A drop bucket configured to receive materials being dispensed into a filling machine, the drop bucket comprising:

a plurality of sidewalls surrounding a volume bounded from above by a top opening and from below by a bottom opening;

a plurality of protrusions formed on a side surface of at least one of the sidewalls, the protrusions being dimensioned and configured to provide a contour to the side surface that reduces the proportion of the side surface that lies in a plane and that breaks the side surface into a plurality of non-contiguous co-planar surfaces; and a socket extending from an outer surface of the inner radial wall and forming a cavity, the socket configured to interfit with a post extending upward from a mounting ring of the filling machine to mount the drop bucket to the mounting ring;

wherein one of the socket and the post includes a catch configured to engage with a mating structure of the other of the socket and the post.

19. The drop bucket of claim 18, wherein the plurality of protrusions are in the form of ridges.

20. The drop bucket of claim 19, wherein the ridges extend vertically and are spaced horizontally from one another.

21. The drop bucket of claim 18, further comprising:

at least one partition extending between two of the plurality of sidewalls, wherein the at least one partition separates the volume of the drop bucket into at least two discrete chambers; and a plurality of protrusions formed on at least one surface of the at least one partition, the protrusions being dimensioned and configured to provide a contour to the at least one surface that reduces the proportion of the at least one surface that lies in a plane and that breaks the at least one surface into a plurality of non-contiguous co-planar surfaces.

22. A rotary filling machine comprising:

a rotatable fill plate including fill openings defined therein;

a plurality of circumferentially spaced drop buckets mounted above the fill plate and configured to rotate with the fill plate, each drop bucket having:

a plurality of sidewalls surrounding a volume, the sidewalls including an inner radial wall, an outer radial wall, a first sidewall, and a second sidewall, wherein the volume is bounded from above by a top opening and from below by a bottom opening;

a wear plate located over the fill plate and disposed below the drop buckets, the wear plate including an outer mounting ring located radially outboard of the fill openings of the fill plate and an inner mounting ring located radially inward of the fill openings;

a plurality of couplers, each coupler including a first connector extending from an outer surface of the inner radial wall of an associated drop bucket and a second connector extending upward from the inner mounting ring; and a stationary slide plate mounted in an upper recess between the inner mounting ring and the outer mounting ring, wherein, when view in a direction of turret rotation, the slide plate has an upstream end, a downstream end, upper and lower surfaces, and inner and outer edges, and wherein a radial diameter of the slide plate is tapered along at least a portion of a circumferential extent of the slide plate so that the slide plate is configured such that that areas of flow paths from the bottoms of the drop buckets through the stationary slide plate increase progressively through the portion of the circumferential extent of the slide plate;

wherein the first and second connectors are configured to interfit with each other to mount the drop bucket on an upper surface of the wear plate and above the stationary slide plate.

* * * * *